United States Patent
Sano et al.

(10) Patent No.: US 8,169,607 B2
(45) Date of Patent: May 1, 2012

(54) OPTICAL CHARACTERISTIC MEASUREMENT DEVICE AND OPTICAL CHARACTERISTIC MEASUREMENT METHOD SUITABLE FOR SPECTRUM MEASUREMENT

(75) Inventors: Hiroyuki Sano, Konan (JP); Makoto Okawauchi, Ritto (JP); Kosei Oshima, Kyotanabe (JP); Kazuaki Ohkubo, Kusatsu (JP); Tsutomu Mizuguchi, Ritto (JP); Shiro Shima, Takatsuki (JP)

(73) Assignee: Otsuka Electronics Co., Ltd., Osaka (JP)

( * ) Notice: Subject to any disclaimer, the term of this patent is extended or adjusted under 35 U.S.C. 154(b) by 284 days.

(21) Appl. No.: 12/573,140

(22) Filed: Oct. 4, 2009

(65) Prior Publication Data
US 2010/0091280 A1    Apr. 15, 2010

(30) Foreign Application Priority Data

Oct. 15, 2008 (JP) .................................. 2008-266056
Aug. 13, 2009 (JP) .................................. 2009-187734

(51) Int. Cl.
*G01J 3/28* (2006.01)
(52) U.S. Cl. ...................................... 356/326; 356/306
(58) Field of Classification Search .................. 356/326, 356/328, 334, 306–307, 300, 303, 330, 369; 250/227.18, 227.23, 227.32
See application file for complete search history.

(56) References Cited

FOREIGN PATENT DOCUMENTS

JP      11-030552     2/1999
JP      2002-005741   1/2002

*Primary Examiner* — Tri T Ton
(74) *Attorney, Agent, or Firm* — Ditthavong Mori & Steiner, P.C.

(57) ABSTRACT

A processing unit obtains a first spectrum detected in a first detection area and a first signal intensity detected in a second detection area after the light entering the housing is cut off, and then calculates a first correction spectrum by subtracting a first correction value calculated based on the first signal intensity from each component value of the first spectrum. The processing unit obtains a second spectrum detected in the first detection area and a second signal intensity detected in the second detection area while a cut-off portion is opened, and then calculates a second correction spectrum by subtracting a second correction value calculated based on the second signal intensity from each component value of the second spectrum. The processing unit calculates an output spectrum representing a measurement result by subtracting a corresponding component value of the first correction spectrum from each component value of the second correction spectrum.

6 Claims, 20 Drawing Sheets

OPTICAL CHARACTERISTIC MEASUREMENT DEVICE AND OPTICAL CHARACTERISTIC MEASUREMENT METHOD SUITABLE FOR SPECTRUM MEASUREMENT

BACKGROUND OF THE INVENTION

1. Field of the Invention

The present invention relates to an optical characteristic measurement device and an optical characteristic measurement method, and particularly to a technique for measuring a spectrum with high accuracy.

2. Description of the Background Art

Conventionally, spectrometry has widely been used as a technique for evaluating an illuminant and the like. In an optical characteristic measurement device used in such spectrometry, a spectrometer (typically, a diffraction grating) is generally used to split light from an illuminant or the like, which is a measurement target, into a plurality of wavelength components and to detect each resultant wavelength component with a photodetector. In order to minimize influence of light other than light to be measured, the spectrometer and the photodetector are accommodated in a housing.

Actually, however, a result of detection by the photodetector may be affected by irregularly reflected light in the housing, light reflected in a diffused manner at a surface of the spectrometer, light having an order other than a measurement order, and the like. In general, such light is referred to as "stray light". Various methods have been proposed in order to suppress influence of such unintended stray light.

For example, Japanese Patent Laying-Open No. 11-030552 discloses a method of correcting stray light by accurately estimating influence of the stray light generated in measurement of light guided from a dispersion optical system of a spectrophotometer with a light receiver having a large number of light-receiving elements as a measurement constant of the spectrophotometer and by eliminating that influence.

In addition, Japanese Patent Laying-Open No. 2002-005741 discloses a spectrum measurement device capable of obtaining an accurate spectrum intensity signal by eliminating influence of stray light generated within the spectrum measurement device or unnecessary light generated by reflection or diffraction at a surface of a detection element through processing of a detection signal.

According to the stray light correction method disclosed in Japanese Patent Laying-Open No. 11-030552, however, it is necessary to calculate a ratio between intensity of a light reception signal measured by each light-receiving element and intensity of a light reception signal measured by the light-receiving element corresponding to the split wavelength, as many times as the number of light-receiving elements constituting a detector. Therefore, this method is relatively time-consuming.

In addition, specific details of correction processing are not disclosed with regard to the spectrum measurement device described in Japanese Patent Laying-Open No. 2002-005741.

SUMMARY OF THE INVENTION

The present invention was made to solve such a problem, and an object of the present invention is to provide an optical characteristic measurement device and an optical characteristic measurement method capable of measuring a spectrum in a shorter period of time with high accuracy.

An optical characteristic measurement device according to one aspect of the present invention includes a housing, a spectrometer arranged in the housing, a cut-off portion for cutting off light entering the spectrometer from outside of the housing, a photodetector arranged in the housing, for receiving light split by the spectrometer, and a processing unit for outputting a result of detection by the photodetector. The photodetector has a detection surface greater than a light incident surface receiving light from the spectrometer. The processing unit is operative to obtain a first spectrum detected in a first detection area corresponding to the light incident surface receiving light from the spectrometer and a first signal intensity detected in a second detection area different from the light incident surface receiving light from the spectrometer while the light entering the housing is cut off, calculate a first correction spectrum by subtracting a first correction value calculated based on the first signal intensity from each component value of the first spectrum, obtain a second spectrum detected in the first detection area and a second signal intensity detected in the second detection area while the cut-off portion is opened, calculate a second correction spectrum by subtracting a second correction value calculated based on the second signal intensity from each component value of the second spectrum, and calculate an output spectrum representing a measurement result by subtracting each component value of the first correction spectrum from a corresponding component value of the second correction spectrum.

Preferably, the optical characteristic measurement device further includes a cut-off filter arranged on an optical path through which light taken into the housing enters the spectrometer, for cutting off light having a wavelength shorter than a prescribed wavelength.

More preferably, the second detection area is provided on a short wavelength side continuing from the first detection area.

Preferably, the second detection area includes a plurality of detection elements. The first correction value is an average value of first signal intensities detected by the plurality of detection elements respectively, and the second correction value is an average value of second signal intensities detected by the plurality of detection elements respectively.

Preferably, the processing unit includes a storage unit for storing the first correction spectrum.

An optical characteristic measurement device according to another aspect of the present invention includes a housing, a spectrometer arranged in the housing, a photodetector arranged in the housing, for receiving light split by the spectrometer, and a processing unit for outputting a result of detection by the photodetector. The photodetector has a detection surface greater than a light incident surface receiving light from the spectrometer. The processing unit is operative to obtain a measurement spectrum detected in a first detection area corresponding to the light incident surface receiving light from the spectrometer and a signal intensity detected in a second detection area different from the light incident surface receiving light from the spectrometer, calculate a first correction spectrum by correcting a pattern prepared in advance and exhibiting a noise characteristic of the photodetector based on the signal intensity, calculate a second correction spectrum by subtracting a correction value calculated based on the signal intensity from each component value of the measurement spectrum, and calculate an output spectrum representing a measurement result by subtracting each component value of the first correction spectrum from a corresponding component value of the second correction spectrum.

Preferably, the processing unit stores a plurality of patterns in correspondence with a plurality of exposure times that can be set in the photodetector and selects one pattern corresponding to the exposure time set in the photodetector when the first correction spectrum is to be calculated.

An optical characteristic measurement method according to yet another aspect of the present invention includes the step of preparing a measurement device including a spectrometer and a photodetector for receiving light split by the spectrometer, that are arranged in a housing. The photodetector has a detection surface greater than a light incident surface receiving light from the spectrometer. The optical characteristic measurement method includes the steps of obtaining a first spectrum detected in a first detection area corresponding to the light incident surface receiving light from the spectrometer and a first signal intensity detected in a second detection area different from the light incident surface receiving light from the spectrometer while light entering the housing is cut off, calculating a first correction spectrum by subtracting a first correction value calculated based on the first signal intensity from each component value of the first spectrum, obtaining a second spectrum detected in the first detection area and a second signal intensity detected in the second detection area while a cut-off portion is opened, calculating a second correction spectrum by subtracting a second correction value calculated based on the second signal intensity from each component value of the second spectrum, and calculating an output spectrum representing a measurement result by subtracting each component value of the first correction spectrum from a corresponding component value of the second correction spectrum.

An optical characteristic measurement method according to yet another aspect of the present invention includes the step of preparing a measurement device including a spectrometer and a photodetector for receiving light split by the spectrometer, that are arranged in a housing. The photodetector has a detection surface greater than a light incident surface receiving light from the spectrometer. The optical characteristic measurement method includes the steps of obtaining a measurement spectrum detected in a first detection area corresponding to the light incident surface receiving light from the spectrometer and a signal intensity detected in a second detection area different from the light incident surface receiving light from the spectrometer, calculating a first correction spectrum by correcting a pattern prepared in advance and exhibiting a noise characteristic of the photodetector based on the signal intensity, calculating a second correction spectrum by subtracting a correction value calculated based on the signal intensity from each component value of the measurement spectrum, and calculating an output spectrum representing a measurement result by subtracting each component value of the first correction spectrum from a corresponding component value of the second correction spectrum.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
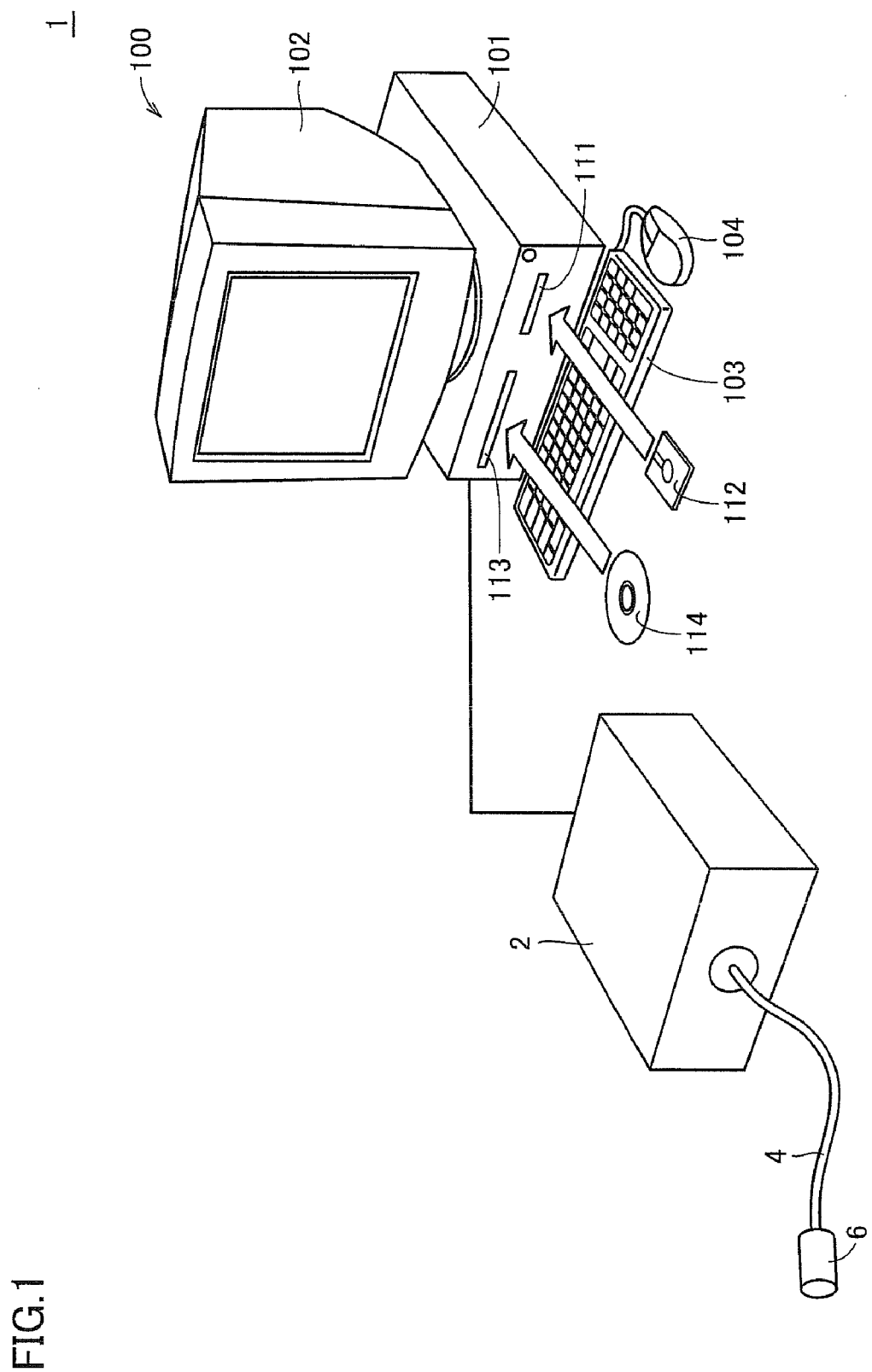
FIG. 1 is a diagram showing appearance of an optical characteristic measurement device according to an embodiment of the present invention.

An embodiment of the present invention will be described in detail with reference to the drawings. The same or corresponding elements in the drawings have the same reference characters allotted, and description thereof will not be repeated.

<Overall Configuration of Device>

Referring to FIG. 1, an optical characteristic measurement device 1 according to the embodiment of the present invention measures a spectrum of various illuminants (hereinafter also referred to as an "object"). In addition, optical characteristic measurement device 1 may calculate such optical characteristics as brightness and tint of the object based on the measurement spectrum. It is noted that brightness refers to luminance, luminous intensity and the like of the object, and tint refers to a chromaticity coordinate, a dominant wavelength, excitation purity, a correlated color temperature, and the like of the object. Optical characteristic measurement device 1 according to the present embodiment is applicable to measurement for a light emitting diode (LED), a flat panel display (FPD), and the like.

Optical characteristic measurement device 1 includes a measurement instrument main body 2 and a processing device 100. A light reception portion 6 is connected to measurement instrument main body 2 through an optical fiber 4. Light emitted from the object and taken in from light reception portion 6 (hereinafter also referred to as "measured light") is guided to measurement instrument main body 2 through optical fiber 4.

As will be described later, measurement instrument main body 2 splits the measured light that enters measurement instrument main body 2 from the object and outputs a result of detection in accordance with intensity of each wavelength component included therein (signal intensity) to processing device 100. As will be described later, measurement instrument main body 2 contains a spectrometer for splitting measured light and a photodetector for receiving light split by the spectrometer. In particular, the photodetector according to the present embodiment has a detection surface greater than a light incident range receiving light from the spectrometer. In addition, processing device 100 outputs the result of detection by the photodetector as it is corrected. More specifically, processing device 100 simultaneously obtains a spectrum detected in a detection area corresponding to a light incident surface receiving light from the spectrometer in the detection surface of the photodetector and a signal intensity detected in a detection area different from the light incident surface receiving light from the spectrometer, independently of each other. Then, processing device 100 eliminates an error component originating from stray light and an offset component caused by a dark current that flows in the photodetector by subtracting a correction value calculated based on the obtained signal intensity from each component value of the spectrum. By performing such processing, the spectrum of the measured light from the object can be measured in a shorter period of time with high accuracy.

<Configuration of Measurement Instrument Main Body>

Figure 2:
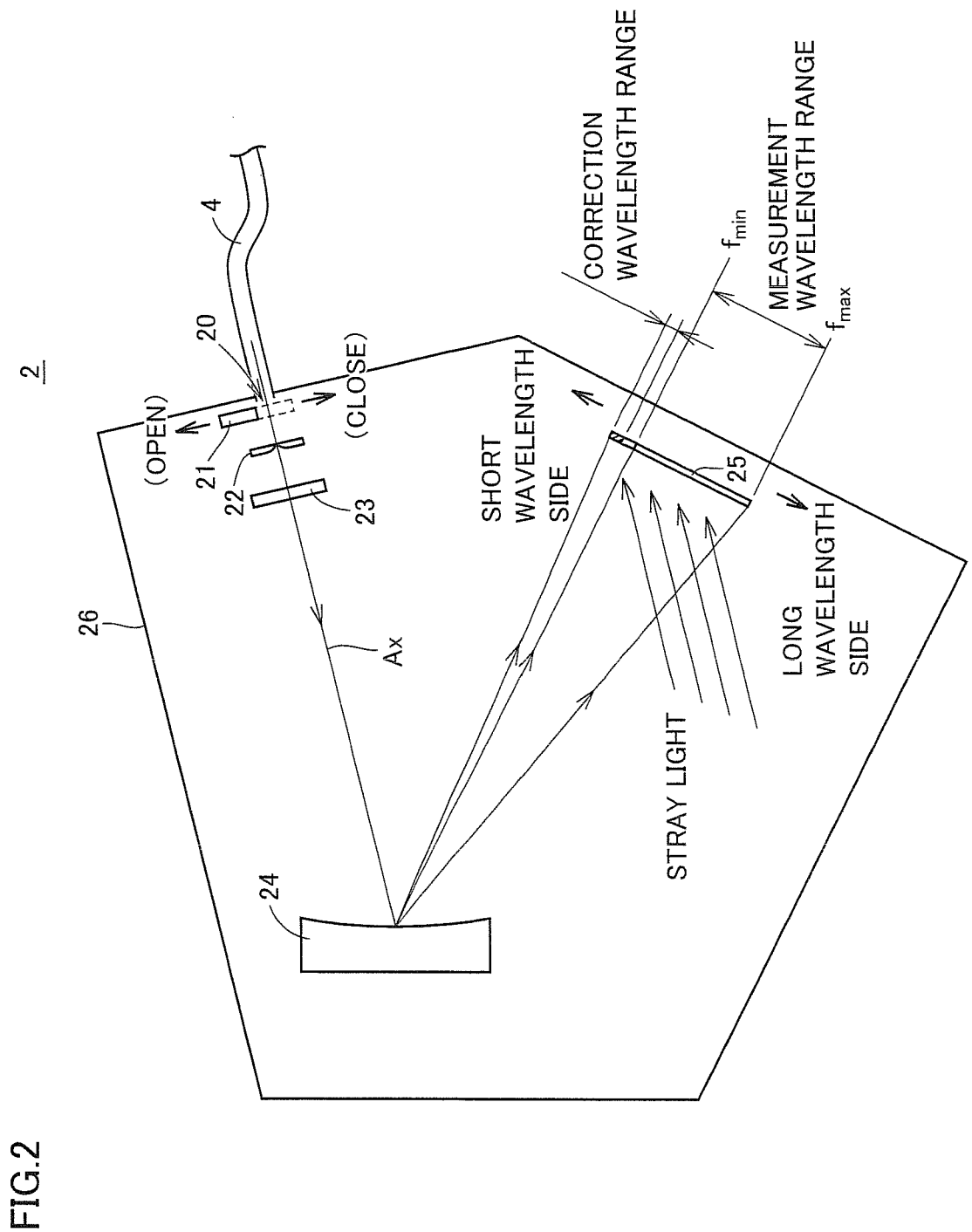
FIG. 2 is a functional block diagram showing overview of the measurement device according to the embodiment of the present invention.

FIG. 2 is a functional block diagram showing overview of measurement instrument main body 2 according to the embodiment of the present invention. Referring to FIG. 2, measurement instrument main body 2 includes a shutter 21, a slit 22, a cut-off filter 23, a spectrometer 24, and a photodetector 25. These components are accommodated in a housing 26. A light input port 20 is formed in a part of housing 26. Light input port 20 is connected to optical fiber 4. The measured light guided by optical fiber 4 enters housing 26 and propagates along a prescribed optical axis Ax. Shutter 21, slit 22, cut-off filter 23, and spectrometer 24 are arranged along this optical axis Ax, sequentially from light input port 20.

Namely, the measured light enters spectrometer 24 after it passes through slit 22 and cut-off filter 23.

Shutter 21 cuts off light that enters housing 26 from the outside of housing 26. Namely, shutter 21 establishes such a state that light does not enter housing 26, in order to obtain a spectrum serving as a calibration reference of the result of detection by photodetector 25 (hereinafter also referred to as a "dark spectrum"). For example, shutter 21 is structured such that it can be displaced in a direction perpendicular to optical axis Ax. Thus, when shutter 21 is located on optical axis Ax (hereinafter also referred to as a "close position"), light that enters housing 26 is cut off. It is noted that an operation for measuring a dark spectrum detected by photodetector 25 while the light that enters housing 26 is cut off is also referred to as "dark measurement". On the other hand, for distinction from this "dark measurement", an ordinary operation for measuring a spectrum of an object is also referred to as "ordinary measurement".

When shutter 21 is located at a position distant from optical axis Ax (hereinafter also referred to as an "open position"), the measured light enters housing 26. Though FIG. 2 illustrates arrangement where shutter 21 is provided inside housing 26, it may be provided outside housing 26. In addition, a mechanism of any type may be employed as a mechanism for cutting off measured light.

Slit 22 adjusts a diameter of luminous flux (size) of the measured light in order to attain prescribed detection resolution. For example, each slit width of slit 22 is set approximately to 0.2 mm to 0.05 mm. The measured light after passing through slit 22 enters cut-off filter 23. It is noted that cut-off filter 23 is arranged at a position substantially corresponding to a focus position of the measured light after passing through slit 22.

Cut-off filter 23 is arranged on optical axis Ax, which is an optical path through which the measured light taken into housing 26 enters spectrometer 24. Cut-off filter 23 cuts off light having a wavelength shorter than a prescribed cut-off wavelength a among components included in this measured light. Namely, cut-off filter 23 allows transmission only of light having a wavelength longer than prescribed cut-off wavelength α. As will be described later, this cut-off wavelength a preferably matches with a lower limit value of a spectral characteristic of spectrometer 24 (wavelength $f_{min}$).

Spectrometer 24 is arranged on optical axis Ax and splits the measured light incident along optical axis Ax into a plurality of wavelengths. The light having wavelengths resulting from spectrometer 24 is guided to photodetector 25. For example, spectrometer 24 is implemented by a concave diffraction grating (grating) called blazed holographic type. This concave diffraction grating reflects incident measured light toward corresponding directions as diffraction light having prescribed wavelength intervals. Therefore, the light split by spectrometer 24 (diffraction light) is emitted toward photodetector 25 in a spatially spread manner.

Instead of the blazed holographic type concave diffraction grating described above, any diffraction grating such as a flat focus type concave diffraction grating may be adopted as spectrometer 24.

Photodetector 25 receives the measured light (diffraction light) split by spectrometer 24. Photodetector 25 detects an intensity of each wavelength component included in the received measured light. The intensity detected by photodetector 25 is brought in correspondence with each wavelength component. Accordingly, the detection signal from photodetector 25 corresponds to the spectrum of the measured light. Photodetector 25 is representatively implemented by a photodiode array (PDA), in which a plurality of detection elements such as photodiodes are arranged in an array. Alternatively, a charge coupled device (CCD) in which a plurality of detection elements such as photodiodes are arranged in matrix may be adopted. For example, photodetector 25 is configured to be able to output signals indicating intensities of 512 wavelength components (channels) in a range from 380 nm to 980 nm. In addition, photodetector 25 includes an A/D (Analog to Digital) converter for outputting a signal indicating a detected light intensity as a digital signal and a peripheral circuit.

<Overview of Correction Processing>

Correction processing in optical characteristic measurement device 1 according to the present embodiment will be described hereinafter with reference to FIGS. 1, 3 and 4. The result of detection by photodetector 25 includes (1) a spectrum to be measured of the measured light, (2) an error component originating from stray light generated within housing 26, (3) an offset component caused by a dark current that flows in photodetector 25, and (4) other error components.

Stray light is collective denotation of irregularly reflected light in housing 26, light reflected in a diffused manner at the surface of spectrometer 24, and light having an order other than a measurement order generated in spectrometer 24.

In addition, photodetector 25 is implemented by a semiconductor device such as a CCD, and a dark current flows when such a semiconductor device is driven. Due to this dark current, the result of detection by photodetector 25 may contain an offset component. In addition, magnitude of the dark current is susceptible to an ambient temperature and it may fluctuate over time, depending on an environment for measurement.

Accordingly, in optical characteristic measurement device 1 according to the present embodiment, in the detection surface of photodetector 25, an area where diffraction light from spectrometer 24 enters and an area where the diffraction light does not enter are provided. Then, processing device 100 corrects the result detected in the area where diffraction light enters with the result detected in the area where diffraction light does not enter. Namely, by making such correction each time ordinary measurement is conducted, influence of stray light and the offset component caused by the dark current can dynamically be corrected. Therefore, even when influence of stray light and/or the offset component caused by the dark current fluctuate(s) over time, correction can effectively be made.

Figure 3:
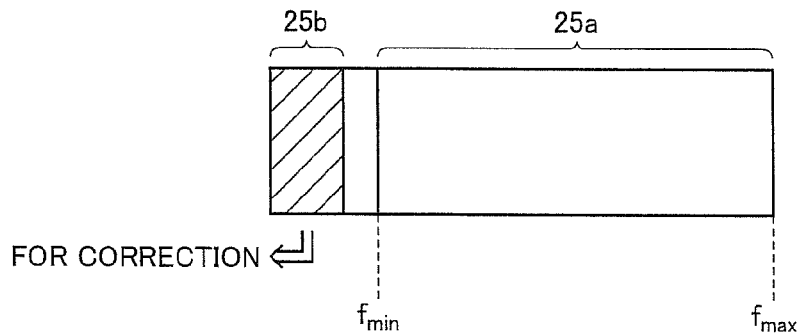
FIG. 3 is a schematic diagram showing a detection surface of a photodetector according to the embodiment of the present embodiment.

FIG. 3 is a schematic diagram showing the detection surface of photodetector 25 according to the embodiment of the present embodiment. Referring to FIG. 3, it is assumed that spectrometer 24 (FIG. 2) is optically designed such that a wavelength component in a range from a wavelength $f_{min}$ to a wavelength $f_{max}$ of the incident measured light is guided to photodetector 25.

Here, it is assumed that cut-off wavelength α of cut-off filter 23 is set to match with wavelength $f_{min}$. Here, a wavelength component shorter than $f_{min}$ (cut-off wavelength α) does not enter spectrometer 24. Therefore, a wavelength component shorter than $f_{min}$ (cut-off wavelength α) does not enter photodetector 25 either.

In the detection surface of photodetector 25, an area corresponding to the range from wavelength $f_{min}$ to wavelength $f_{max}$ (hereinafter also referred to as a "measurement wavelength range") is defined as a detection area 25a. Namely, detection area 25a is an area corresponding to the light incident surface receiving light from spectrometer 24. In addition, a prescribed range on a short wavelength side continuing from detection area 25a (hereinafter also referred to as a "correction wavelength range") is defined as a correction area 25b. Though the entire range on the side of a wavelength shorter than wavelength $f_{min}$ may be handled as correction area 25b, in order to avoid influence of the measured light, detection area 25a and correction area 25b are preferably distant from each other by a prescribed wavelength width.

Referring again to FIG. 2, stray light generated in housing 26 can be regarded as uniformly diffusing. Therefore, stray light incident on the detection surface of photodetector 25 can be regarded as substantially equal. Namely, the intensity of stray light incident on each of the plurality of detection elements constituting detection area 25a and correction area 25b is substantially identical to each other.

In addition, detection area 25a and correction area 25b are provided on common photodetector 25. Accordingly, the offset component caused by the dark current that is included in the detection result in detection area 25a and correction area 25b can also be regarded as substantially uniform.

Figure 4:
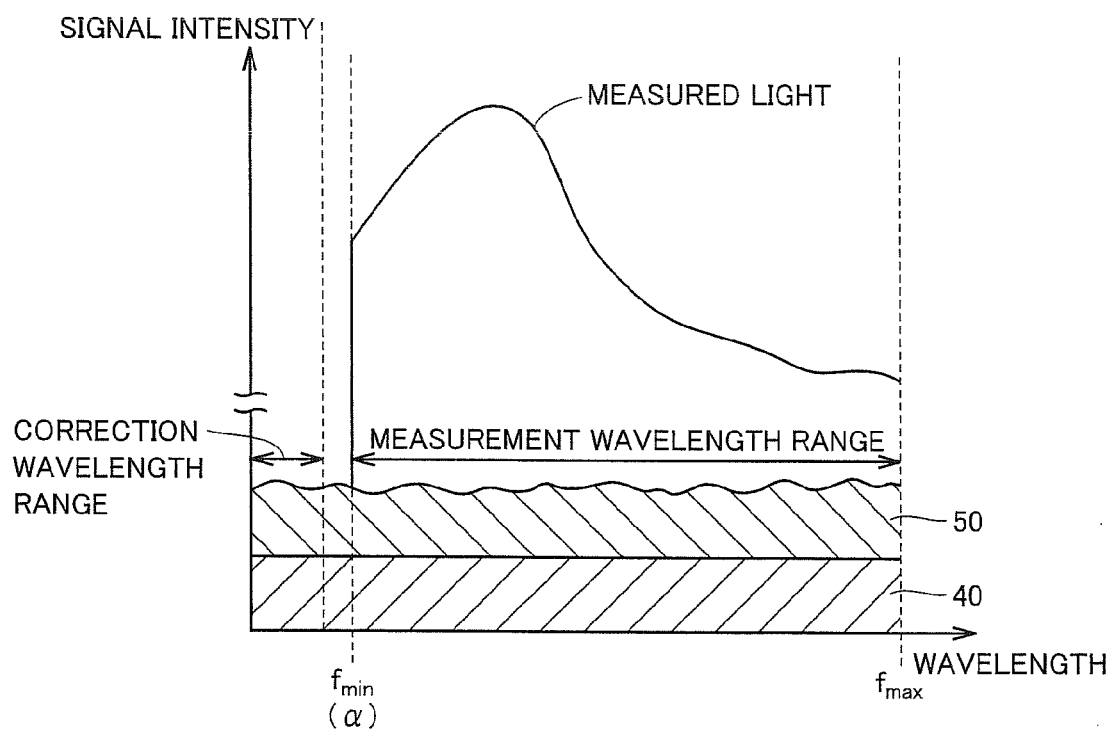
FIG. 4 is a conceptual diagram showing an exemplary detection result output from the photodetector in the optical characteristic measurement device according to the embodiment of the present invention.

Based on the consideration as above, photodetector 25 outputs the detection result as shown in FIG. 4.

FIG. 4 is a conceptual diagram showing an exemplary detection result output from photodetector 25 in optical characteristic measurement device 1 according to the embodiment of the present invention.

Referring to FIG. 4, the detection result output from photodetector 25 includes an error component 40 originating from stray light. Error component 40 can be regarded as having a uniform signal intensity over a detectable wavelength range. In addition, the detection result includes an offset component 50 caused by the dark current that flows in the plurality of detection elements included in photodetector 25. Offset component 50 depends on an ambient temperature and it also fluctuates over time.

In addition, in the measurement wavelength range, a signal intensity in accordance with the spectrum of the measured light appears. On the other hand, in the correction wavelength range, a signal intensity in accordance with the measured light does not appear.

Therefore, the error component originating from stray light and the offset component caused by the dark current can be eliminated by subtracting the correction value calculated based on the signal intensity detected in correction area 25b (FIG. 3) from each component value of a measurement spectrum detected in detection area 25a (FIG. 3). Consequently, a true spectrum of the measured light can be obtained. It is noted that correction area 25b is preferably set to include a plurality of detection elements, and in this case, a plurality of signal intensities can be detected. Therefore, a value representative of signal intensities detected by respective detection elements included in correction area 25b (typically, an average value or an intermediate value) is preferably employed as the correction value.

In addition, in the optical characteristic measurement device according to the present embodiment, the dark spectrum detected by photodetector 25 while light does not enter housing 26 is also corrected so as to eliminate the error component originating from stray light and the offset caused by the dark current as described above, and the resultant dark spectrum is stored as a reference value. The corrected dark spectrum stored as the reference value does not include (1) a measurement value of the measured light, (2) the error component originating from stray light generated in housing 26, and (3) the offset component caused by the dark current that flows in photodetector 25. Namely, the corrected dark spectrum reflects an error factor specific to each device, such as variation among detection elements.

Therefore, in each measurement, the spectrum of the measured light can be measured with high accuracy, by subtracting the signal intensity detected in correction area 25b (FIG. 3) and the corrected dark spectrum from the measurement spectrum detected by photodetector 25. In addition, in every ordinary measurement, as it is not necessary to open and close shutter 21 (FIG. 2) only for measuring the error component originating from stray light and/or the offset component caused by the dark current, the time required for measurement can be shortened.

<Configuration of Processing Device>

Referring again to FIG. 1, processing device 100 is representatively implemented by a computer. More specifically, processing device 100 includes a computer main body 101 incorporating an FD (Flexible Disk) drive 111 and a CD-ROM (Compact Disk-Read Only Memory) drive 113, a monitor 102, a keyboard 103, and a mouse 104. As computer main body 101 executes a program stored in advance, the correction processing described above is provided.

Figure 5:
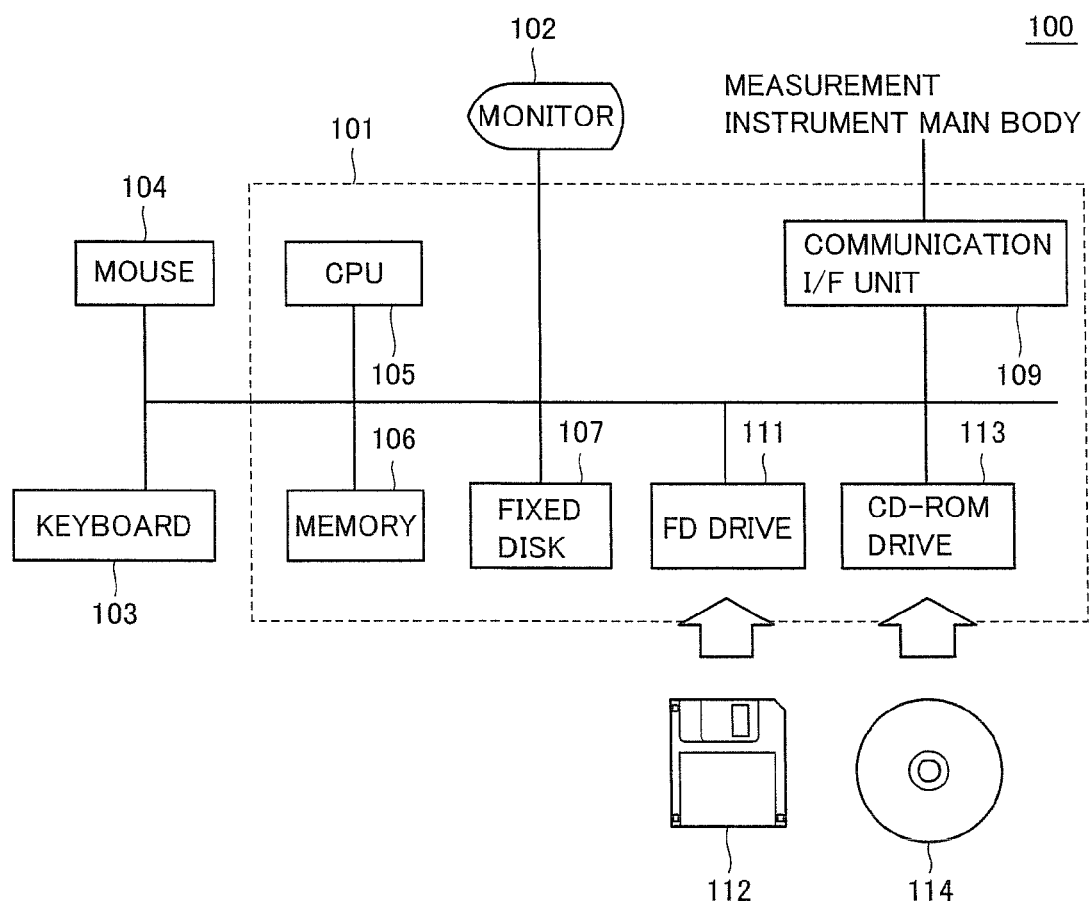
FIG. 5 is a schematic configuration diagram showing a hardware configuration of a processing device according to the embodiment of the present invention.

FIG. 5 is a schematic configuration diagram showing a hardware configuration of processing device 100 according to the embodiment of the present invention. Referring to FIG. 5, computer main body 101 includes, in addition to FD drive 111 and CD-ROM drive 113 shown in FIG. 1, a CPU (Central Processing Unit) 105, a memory 106, a fixed disk 107, and a communication interface (I/F) unit 109, that are connected to each other through a bus.

An FD 112 is attachable to FD drive 111, and a CD-ROM 114 is attachable to CD-ROM drive 113. Processing device 100 according to the present embodiment is implemented by execution of a program by CPU 105 using computer hardware such as memory 106. In general, such a program is distributed as it is stored in a non-transitory storage medium such as FD 112 or CD-ROM 114 or through a network or the like. Such a program is then read from a storage medium by means of FD drive 111, CD-ROM drive 113, or the like and once stored in fixed disk 107 representing a storage device. In addition, the program is read from fixed disk 107 to memory 106 and executed by CPU 105.

CPU 105 serves as an operation processing unit for performing various operations by sequentially executing programmed instructions. Memory 106 temporarily stores various types of information as CPU 105 executes the program.

Communication interface unit 109 is a device for mediating data communication between computer main body 101 and measurement instrument main body 2 (FIG. 1). Communication interface unit 109 receives an electric signal indicating measurement data transmitted from measurement instrument main body 2 and converts the signal into a data format adapted to processing by CPU 105, and converts an instruction or the like output by CPU 105 into an electric signal and sends the signal to measurement instrument main body 2.

Monitor 102 connected to computer main body 101 is a display device for displaying a calculation result such as brightness or tint of the object that is calculated by CPU 105, and it is implemented, for example, by a liquid crystal display (LCD) or a cathode ray tube (CRT).

Keyboard 103 accepts an instruction from a user through an input key. Mouse 104 accepts an instruction from a user through an operation such as clicking or sliding.

In addition, other output devices such as a printer may be connected to computer main body 101 as necessary.

<Measurement Procedure>

For facilitating understanding of the correction processing in optical characteristic measurement device 1 according to the present embodiment, a measurement procedure in connection with the related art of the present invention will initially be described.

(1. Processing Procedure in Connection with Related Art)

Figure 6:
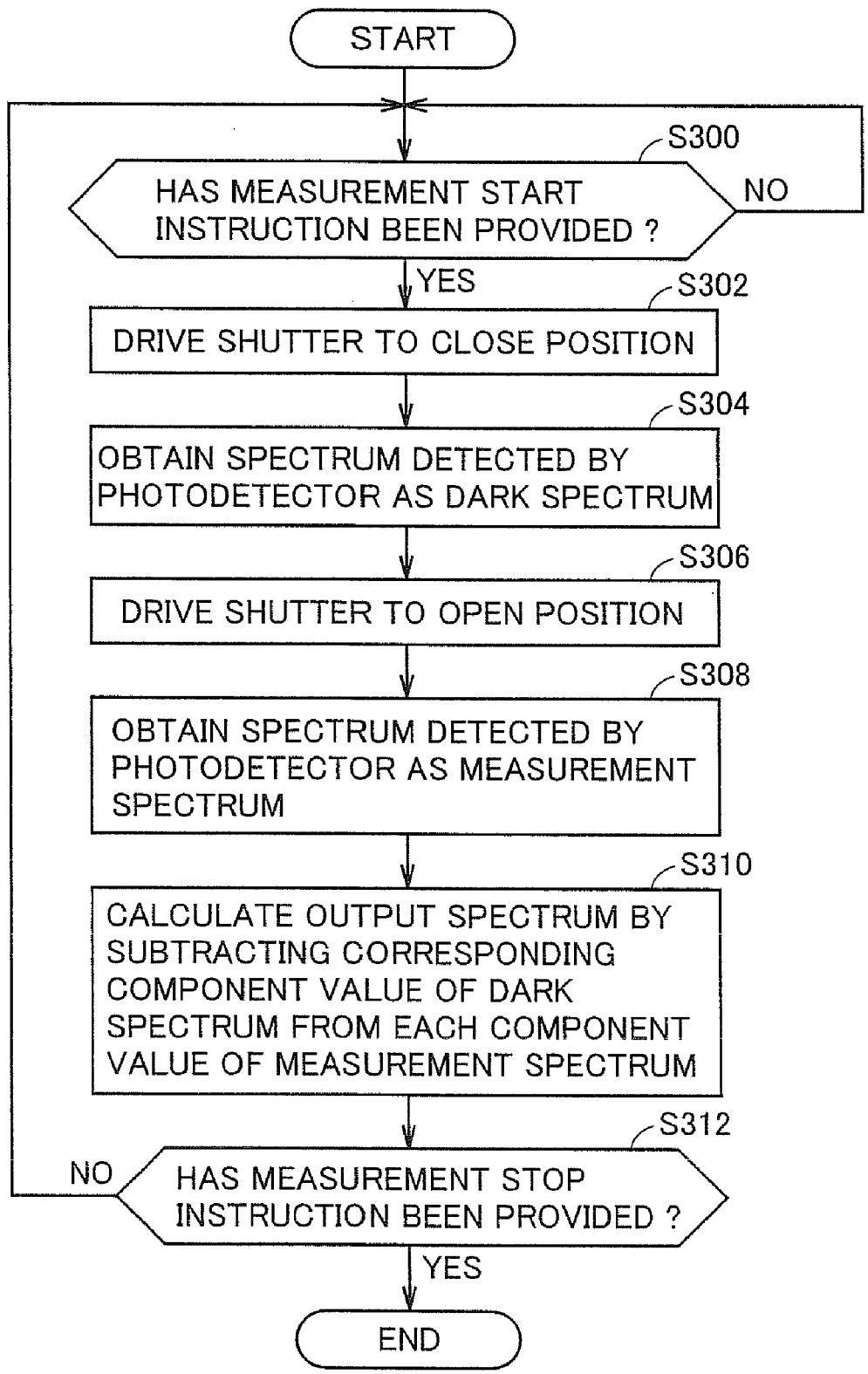
FIG. 6 is a flowchart showing a measurement procedure in an optical characteristic measurement device according to the related art of the present invention.

FIG. 6 is a flowchart showing the measurement procedure in an optical characteristic measurement device according to the related art of the present invention. It is noted that FIG. 6 shows a processing procedure where dark measurement is conduced each time ordinary measurement is conducted.

Referring to FIG. 6, the processing device determines whether a measurement start instruction has been provided or not (step S300). When the measurement start instruction has not been provided (NO in step S300), the processing device waits until the measurement start instruction is provided. Before the measurement start instruction is provided, positioning of the object and/or the light reception portion is carried out such that light emitted from the object is taken into the light reception portion.

On the other hand, when the measurement start instruction is provided (YES in step S300), initially, dark measurement shown in step S302 and step S304 is conducted. Specifically, the processing device drives the shutter to the close position (step S302). Namely, a state that light is prevented from entering the housing is established. In succession, the processing device obtains the spectrum detected by the photodetector as the dark spectrum (step S304).

In succession, ordinary measurement shown in steps S306 to S310 is conducted. Specifically, the processing device drives the shutter to the open position (step S306). Namely, the measured light is taken into the housing. In succession, the processing device obtains the spectrum detected by the photodetector as the measurement spectrum (step S308). In addition, the processing device calculates an output spectrum by subtracting the corresponding component value of the dark spectrum obtained in step S304 from each component value of the measurement spectrum obtained in step S308 (step S310). The output spectrum is output as the detection result.

Thereafter, whether a measurement stop instruction has been provided or not is determined (step S312). When the measurement stop instruction has not been provided (NO in step S312), the process returns to step S300.

On the other hand, when the measurement stop instruction is provided (YES in step S312), the process ends.

(2. Processing Procedure According to the Present Embodiment)

In optical characteristic measurement device 1 according to the present embodiment, prior to a series of ordinary measurement procedures, dark measurement is conducted. After the dark measurement is conducted, ordinary measurement of the object is conducted. The processing procedure will be described hereinafter with reference to FIGS. 7 and 8.

Figure 7:
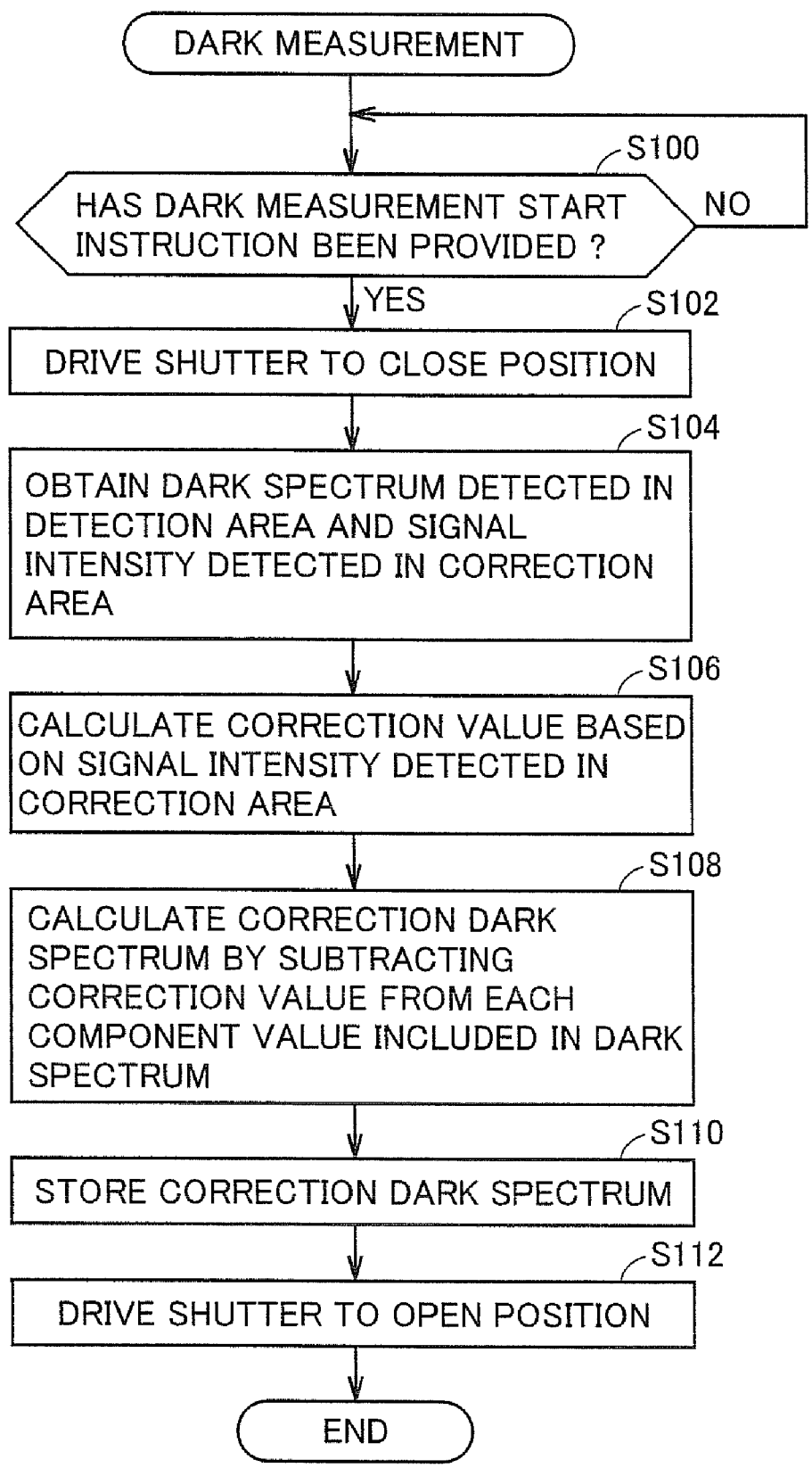
FIG. 7 is a flowchart showing a processing procedure for dark measurement in the optical characteristic measurement device according to the embodiment of the present invention.
Figure 8:
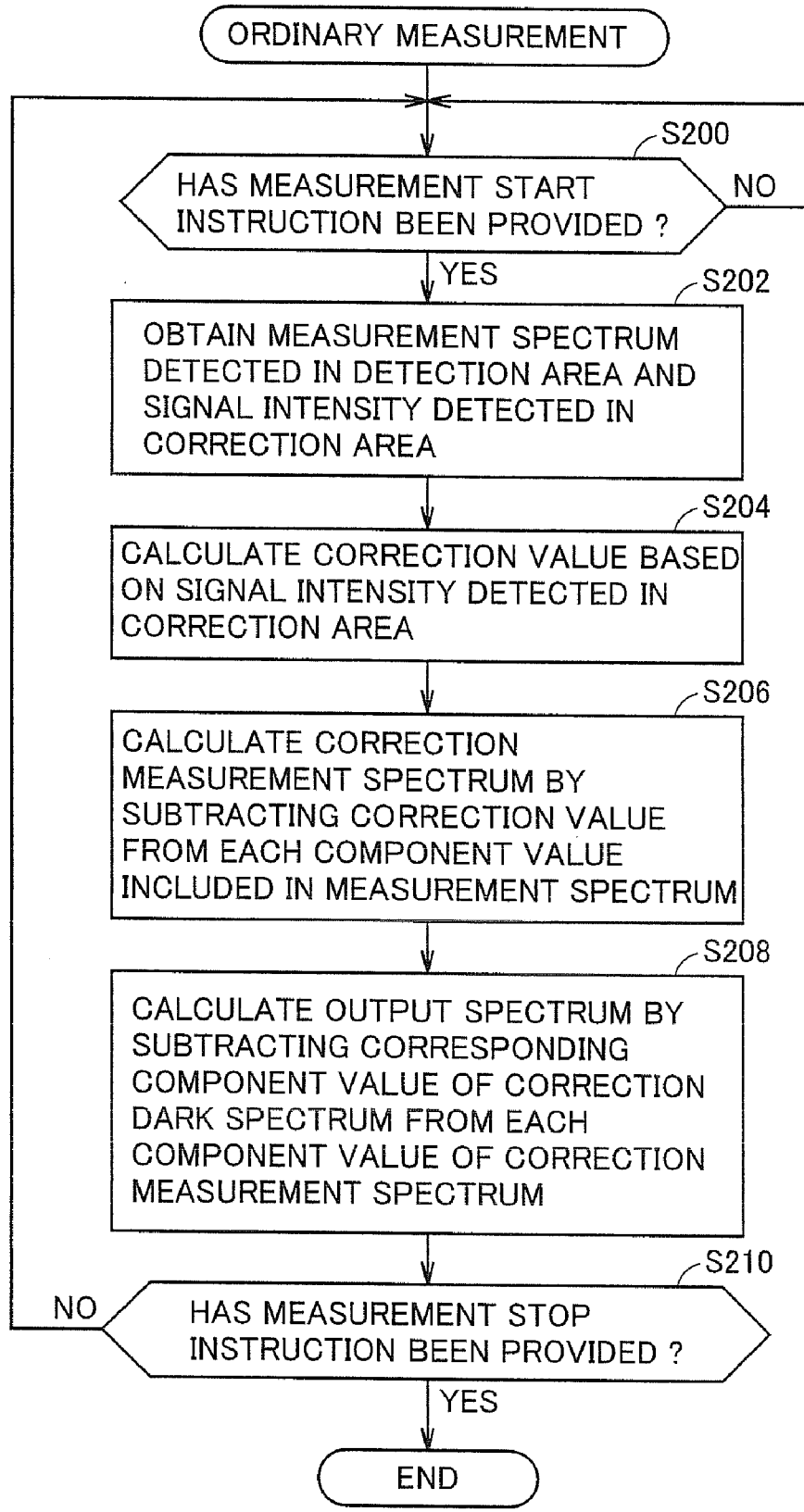
FIG. 8 is a flowchart showing a processing procedure for ordinary measurement in the optical characteristic measurement device according to the embodiment of the present invention.

FIG. 7 is a flowchart showing the processing procedure for dark measurement in optical characteristic measurement device 1 according to the embodiment of the present invention. FIG. 8 is a flowchart showing the processing procedure for ordinary measurement in optical characteristic measurement device 1 according to the embodiment of the present invention.

Referring to FIG. 7, processing device 100 determines whether a dark measurement start instruction has been provided or not (step S100). When the dark measurement start instruction has not been provided (NO in step S100), processing device 100 waits until the dark measurement start instruction is provided.

On the other hand, when the dark measurement start instruction is provided (YES in step S100), processing device 100 drives shutter 21 to the close position (step S102). Namely, a state that light is prevented from entering housing 26 is established. In succession, processing device 100 obtains the spectrum detected in detection area 25a of photodetector 25 (dark spectrum) and the signal intensity detected in correction area 25b of photodetector 25 (step S104). In succession, processing device 100 calculates the correction value based on the signal intensity detected in correction area 25b (step S106). More specifically, processing device 100 calculates an average value of a plurality of signal intensities detected in correction area 25b as the correction value.

In addition, processing device 100 calculates the correction dark spectrum by (uniformly) subtracting the correction value calculated in step S106 from each component value (signal intensity) included in the dark spectrum detected in detection area 25a, that was obtained in step S104 (step S108). Namely, processing device 100 calculates the correction dark spectrum by correcting the dark spectrum with the correction value calculated based on the signal intensity detected in correction area 25b. In addition, processing device 100 has the correction dark spectrum calculated in step S108 stored (step S110).

Thereafter, processing device 100 drives shutter 21 to the open position (step S112). Thus, optical characteristic measurement device 1 enters a measurement state. Then, the dark measurement ends.

Referring next to FIG. 8, processing device 100 determines whether the measurement start instruction has been provided or not (step S200). When the measurement start instruction has not been provided (NO in step S200), processing device 100 waits until the measurement start instruction is provided. Before the measurement start instruction is provided, positioning of the object and/or light reception portion 6 is carried out such that light emitted from the object is taken into light reception portion 6.

On the other hand, when the measurement start instruction is provided (YES in step S200), processing device 100 obtains the measurement spectrum detected in detection area 25a of photodetector 25 and the signal intensity detected in correction area 25b of photodetector 25 (step S202). As shutter 21 is driven to the open position after the previously conducted dark measurement, optical characteristic measurement device 1 has entered a measurement state that shutter 21 corresponding to the cut-off portion is open.

In succession, processing device 100 calculates the correction value based on the signal intensity detected in correction area 25b (step S204). More specifically, an average value of a plurality of signal intensities detected in correction area 25b is calculated as the correction value.

In addition, processing device 100 calculates a correction measurement spectrum by (uniformly) subtracting the correction value calculated in step S204 from each component value (signal intensity) included in the measurement spectrum detected in detection area 25a, that was obtained in step S202 (step S206). Namely, processing device 100 calculates the correction measurement spectrum by correcting the measurement spectrum with the correction value calculated based on the signal intensity detected in correction area 25b. Moreover, processing device 100 calculates an output spectrum by subtracting the corresponding component value of the correction dark spectrum calculated in previously conducted dark spectrum (step S108) from each component value of the correction measurement spectrum calculated in step S206 (step S208). This output spectrum is output as the detection result.

Thereafter, whether the measurement stop instruction has been provided or not is determined (step S210). When the measurement stop instruction has not been provided (NO in step S210), the process returns to step S200.

On the other hand, when the measurement stop instruction is provided (YES in step S210), the process ends.

As described above, in optical characteristic measurement device 1 according to the present embodiment, it is not necessary to conduct dark measurement each time ordinary measurement is conducted. Therefore, the time required for ordinary measurement can be shortened.

<Control Structure>

Figure 9:
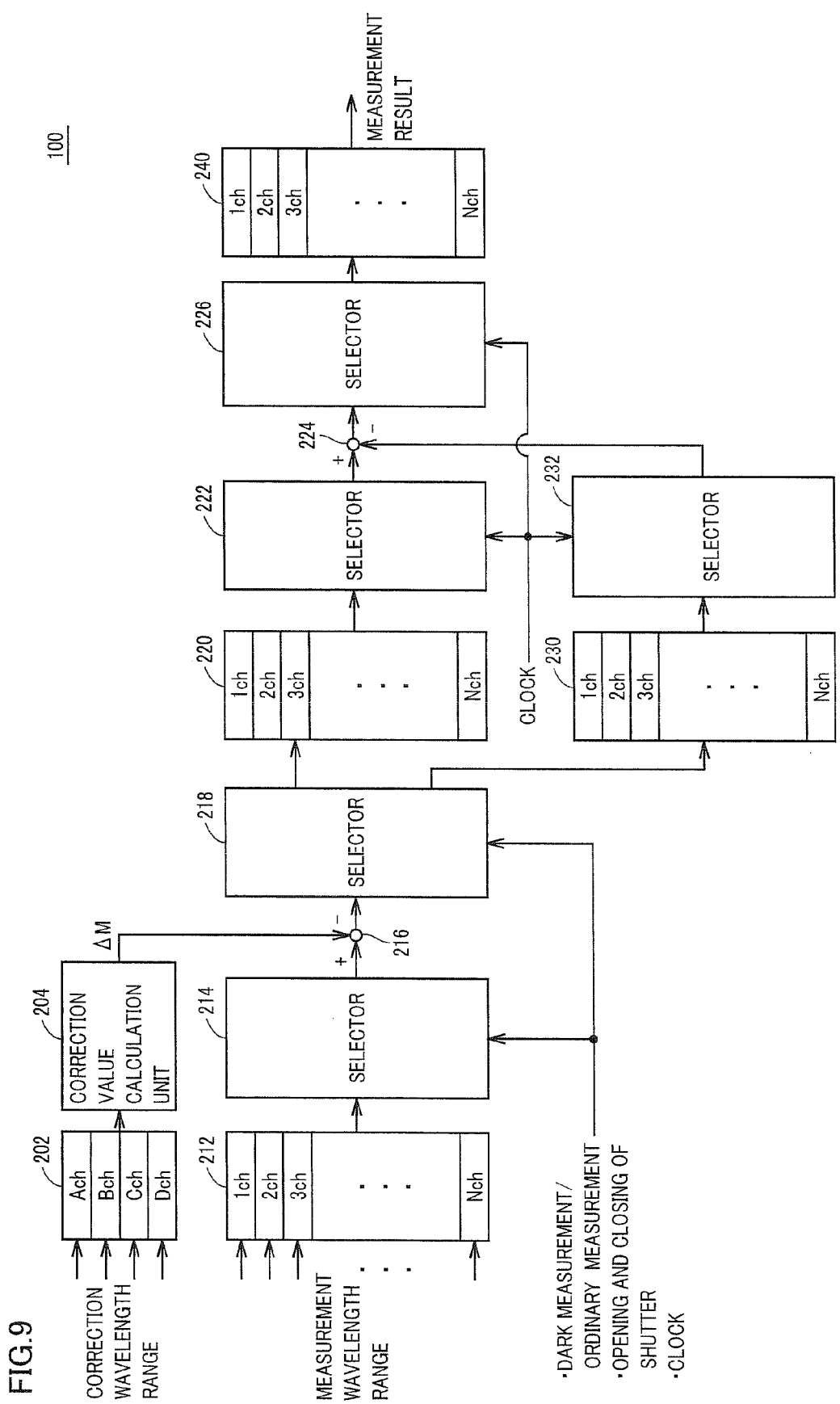
FIG. 9 is a schematic diagram showing a control structure in the processing device of the optical characteristic measurement device according to the embodiment of the present invention.

FIG. 9 is a schematic diagram showing a control structure in processing device 100 of optical characteristic measurement device 1 according to the embodiment of the present invention.

Referring to FIG. 9, processing device 100 according to the present embodiment includes buffers 202, 212, 220, and 240, a correction value calculation unit 204, selectors 214, 218, 222, 226, and 232, subtraction units 216 and 224, and a memory 230. FIG. 9 exemplarily shows a control structure corresponding to an example where detection area 25a (FIG. 3) corresponding to the measurement wavelength range has N detection elements and correction area 25b corresponding to the correction wavelength range has four detection elements.

A value detected in detection area 25a of photodetector 25 (signal intensity at each wavelength) is temporarily stored in buffer 212. In addition, a value detected in correction area 25b of photodetector 25 (signal intensity) is temporarily stored in buffer 202. Buffer 212 has at least N partitioned areas (1ch, 2ch, . . . , Nch) corresponding in number to the detection elements included in detection area 25a. Moreover, buffer 202 has at least four partitioned areas (Ach, Bch, Cch, Dch) corresponding in number to the detection elements included in correction area 25b. It is noted that data stored in buffers 202 and 212 is sequentially updated every detection cycle (for example, several msec to several ten msec) of photodetector 25. Further, a channel (ch) is brought in correspondence with a wavelength detected by photodetector 25.

Correction value calculation unit 204 calculates a correction value $\Delta M$ based on the signal intensity detected in correction area 25b and stored in buffer 202. Specifically, correction value calculation unit 204 calculates an average value (or an intermediate value) of four signal intensities stored in buffer 202 as correction value $\Delta M$.

Selector 214 and subtraction unit 216 subtract correction value $\Delta M$ from each component value of the dark spectrum or the measurement spectrum detected in detection area 25a. More specifically, selector 214 sequentially reads the signal intensity at each wavelength (channel) stored in buffer 212 in response to a clock signal CLOCK and outputs the signal intensity to subtraction unit 216. Subtraction unit 216 subtracts correction value $\Delta M$ from the signal intensity input from selector 214 and outputs the result to selector 218. Therefore, subtraction unit 216 outputs the result of subtraction of correction value $\Delta M$ from the signal intensity at each wavelength stored in buffer 212.

Selector 218 determines whether the obtained spectrum is either the dark spectrum or the measurement spectrum, in accordance with a state of optical characteristic measurement device 1 (dark measurement or ordinary measurement), a state of opening and closing of shutter 21, and the like. Then, selector 218 causes any one of buffer 220 and memory 230 to sequentially store a result value output from subtraction unit 216, in response to clock signal CLOCK common to selector 214.

Buffer 220 temporarily stores the correction measurement spectrum and memory 230 stores the correction dark spectrum in a non-volatile manner. Preferably, the correction dark spectrum is stored in a non-volatile manner until another dark measurement is conducted after dark measurement is completed, because the correction dark spectrum is repeatedly used in ordinary measurement.

Namely, during dark measurement, buffer 212 stores the signal intensity at each wavelength indicating the dark spectrum. Here, selector 218 causes memory 230 to sequentially store the result obtained by uniformly subtracting correction value ΔM by means of subtraction unit 216. On the other hand, during ordinary measurement, buffer 212 stores the signal intensity at each wavelength indicating the measurement spectrum. Here, selector 218 causes buffer 220 to sequentially store the result obtained by uniformly subtracting correction value ΔM by means of subtraction unit 216. Namely, assuming that the signal intensity at each wavelength of the spectrum stored in buffer 212 is denoted as A(i) {where $1 \leq i \leq n$}, a corrected spectrum B(i) stored in buffer 220 or memory 230 can be expressed as shown below.

$$B(i)=A(i)-\Delta M \text{ \{where } 1 \leq i \leq n\}$$

In addition, selector 214 and selector 218 are in synchronization with each other, in response to clock signal CLOCK. Therefore, for example, the signal intensity read from 1ch of buffer 212 is stored in 1ch of buffer 220 or 1ch of memory 230.

Selectors 222, 226 and 232 and subtraction unit 224 calculate the output spectrum by subtracting the corresponding component value of the correction dark spectrum from each component value of the correction measurement spectrum. More specifically, in response to clock signal CLOCK, selector 222 sequentially reads the signal intensity at each wavelength (channel) of the correction measurement spectrum stored in buffer 220 and outputs the signal intensity to subtraction unit 224. Similarly, in response to clock signal CLOCK common to selector 222, selector 232 sequentially reads the signal intensity at each wavelength (channel) of the correction dark spectrum stored in memory 230 and outputs the signal intensity to subtraction unit 224. Subtraction unit 224 subtracts the signal intensity input from selector 232 from the signal intensity input from selector 222 and outputs the result to selector 226. In addition, selector 222 and selector 232 operate in synchronization with each other in response to clock signal CLOCK.

Selector 226 causes buffer 240 to sequentially store the result value output from subtraction unit 224 in response to clock signal CLOCK common to selectors 222 and 232.

Therefore, buffer 240 stores the result of subtraction of the corresponding component value of the correction dark spectrum from each component value of the correction measurement spectrum. Namely, assuming that the signal intensity at each wavelength of the correction measurement spectrum stored in buffer 220 is denoted as S(i) {where $1 \leq i \leq N$} and the signal intensity at each wavelength of the correction dark spectrum stored in memory 230 is denoted as D(i) {where $1 \leq i \leq N$}, an output spectrum M(i) stored in buffer 240 can be expressed as shown below.

$$M(i)=S(i)-D(i) \text{ \{where } 1 \leq i \leq N\}$$

This output spectrum stored in buffer 240 is output as the measurement result.

The control structure shown in FIG. 9 is provided typically by development and execution by CPU 105 (FIG. 5) of a program stored in fixed disk 107 (FIG. 5) or the like on memory 106 (FIG. 5). It is noted that the control structure shown in FIG. 9 may partially or entirely be provided by hardware.

In addition, though FIG. 9 illustrates a configuration adopting serial operation processing with regard to the signal intensity at each wavelength, such parallel operation processing as subtraction of spectra simultaneously in respective channels may be adopted. Alternatively, any operation method may be adopted so long as arithmetic operation processing as described above can be implemented.

<Measurement Example>

An exemplary actual measurement result regarding an effect of reducing errors originating from stray light or the like in optical characteristic measurement device 1 according to the present embodiment described above will be shown below.

As a method for evaluating influence of stray light, conditions for performance of a spectrophotometer as to "stray light" are defined in Japanese Industrial Standards JIS Z8724: 1997 "Methods of color measurement—light source color." Under this JIS, performance in eliminating errors caused by stray light in the correction processing according to the present embodiment was evaluated. In addition, for comparison, a measurement result obtained when the correction processing according to the present embodiment was not applied is also shown. Even when the correction processing is not applied, the correction processing for eliminating the offset component caused by the dark current from the detection value of photodetector 25 was performed, as in the measurement procedure shown in FIG. 6 above.

JIS above defines evaluation of stray light by using a tungsten lamp as a light source of the measured light. Specifically, initially, an output from the photodetector with regard to light emitted from the tungsten lamp (a reference value) is obtained. Then, outputs from the photodetector when sharp cut-off filters having transmission threshold wavelengths of 500±5 (nm), 560±5 (nm) and 660±5 (nm) respectively are inserted in an incident optical path of the light emitted from the tungsten lamp are obtained. It is noted that the outputs to be evaluated are those values at 450 (nm), 500 (nm) and 600 (nm), respectively. Finally, a ratio of each output to the reference value is calculated as a value for evaluating stray light (a stray light ratio).

In the present measurement example, three sharp cut-off filters having transmission threshold wavelengths of 495 (nm), 550 (nm) and 665 (nm) respectively were used for evaluation.

Figure 10:
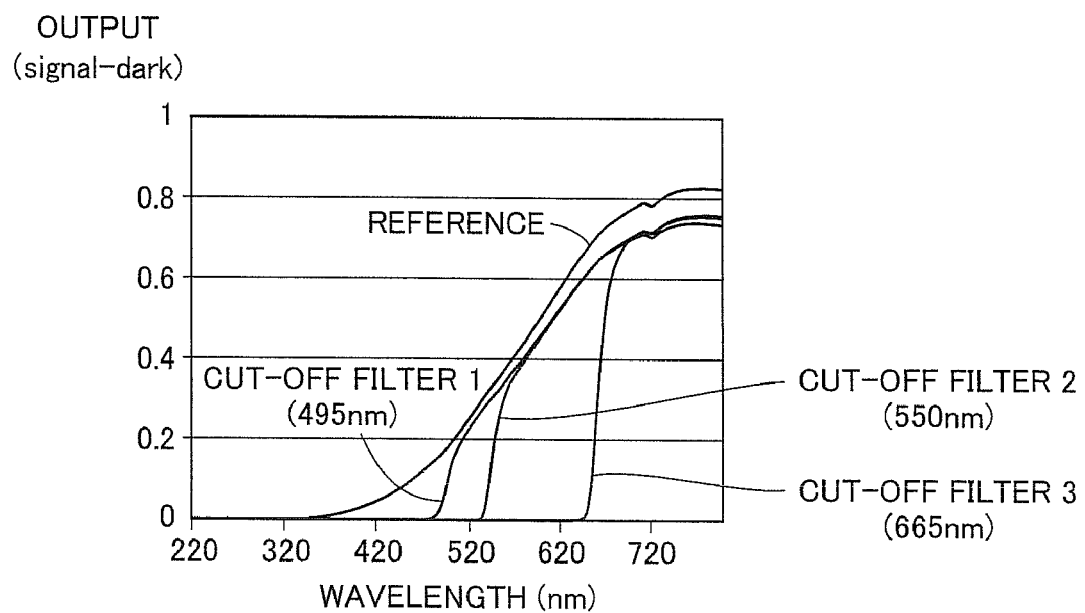
FIG. 10 is a diagram showing an exemplary stray light evaluation result as to the optical characteristic measurement device according to the embodiment of the present invention.
Figure 11A:
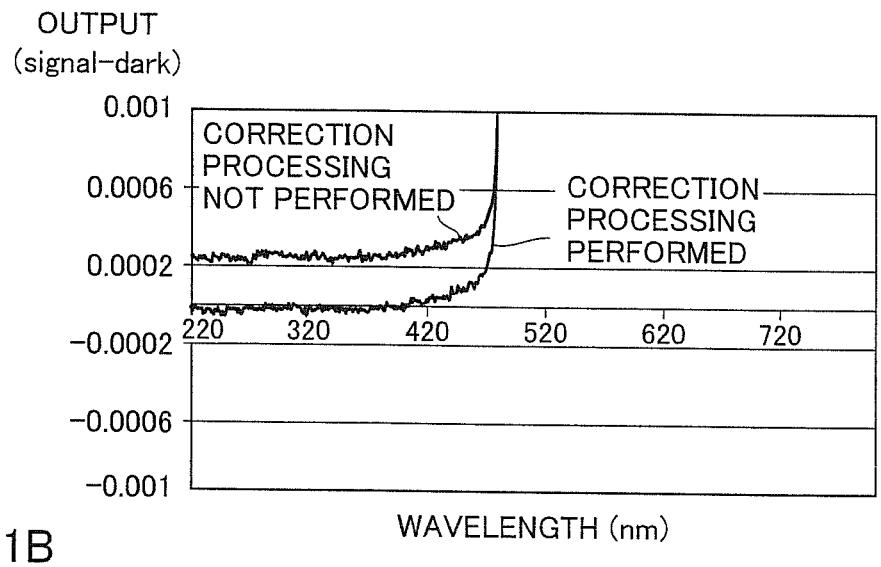
FIGS. 11A to 11C are enlarged views of a substantial part of a spectrum shown in FIG. 10.
Figure 11B:
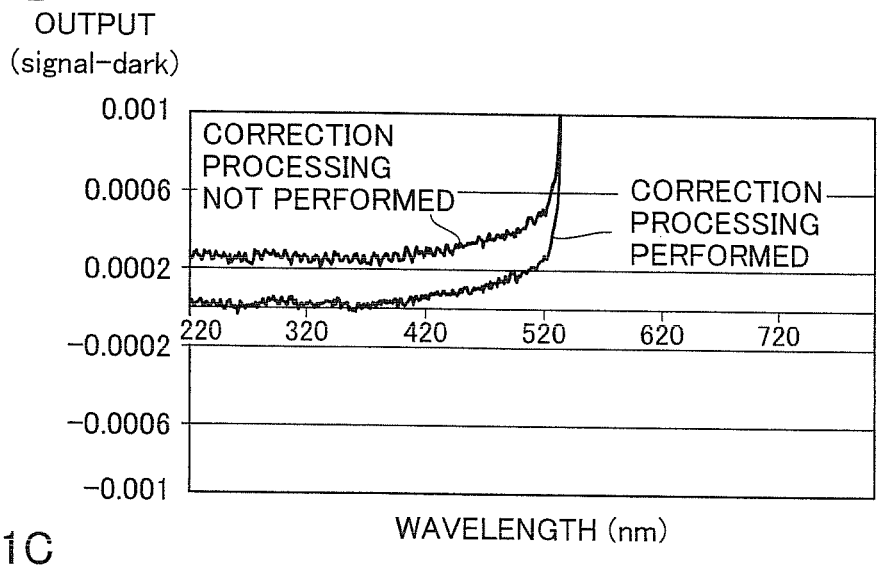
Figure 11C:
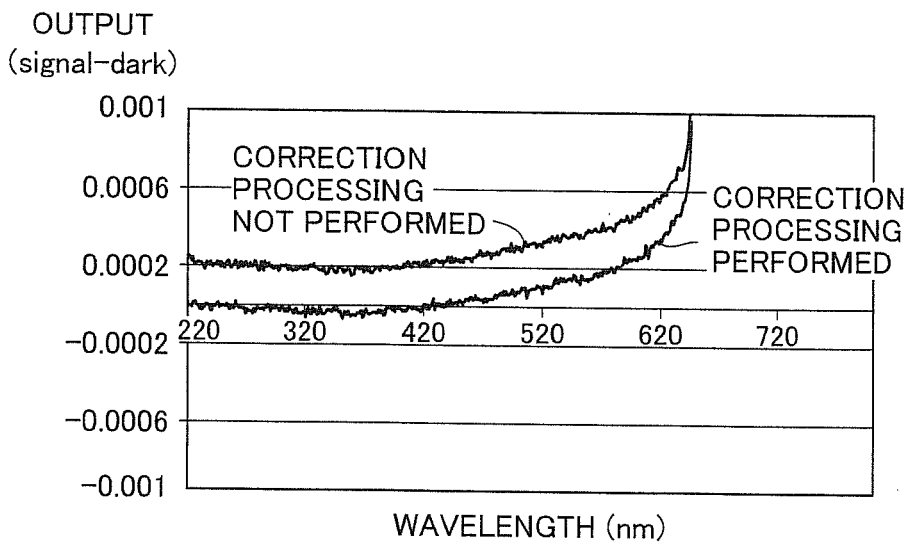

FIG. 10 is a diagram showing an exemplary stray light evaluation result as to optical characteristic measurement device 1 according to the embodiment of the present invention. FIGS. 11A to 11C show partially enlarged views of a spectrum shown in FIG. 10.

FIG. 10 shows measurement examples in a state where no cut-off filter is inserted (reference) and in a state where each sharp cut-off filter is inserted. As shown in FIG. 10, it can be seen that a wavelength shorter than the corresponding transmission threshold wavelength is cut off as a result of insertion of the sharp cut-off filter.

FIG. 11A shows difference in signal intensity in the vicinity of 450 (nm) depending on whether the correction processing is performed or not, in an example where the sharp cut-off filter having the transmission threshold wavelength of 495 (nm) is inserted. In addition, FIG. 11B shows difference in signal intensity in the vicinity of 550 (nm) depending on whether the correction processing is performed or not, in an example where the sharp cut-off filter having the transmission threshold wavelength of 550 (nm) is inserted. Moreover, FIG. 11C shows difference in signal intensity in the vicinity of 600 (nm) depending on whether the correction processing is performed or not, in an example where the sharp cut-off filter having the transmission threshold wavelength of 665 (nm) is inserted.

In the examples shown in any figures, it can be seen that the output is close to a zero value by applying the correction processing according to the present embodiment.

The results as above are summarized in the table shown below. It is noted that the "reduction ratio" in the table indicates a ratio in magnitude of the stray light ratio in an example where the correction processing is applied to the stray light ratio in an example where the correction processing is not applied.

| Evaluation Wavelength (nm) | Reference Signal Intensity | Correction Processing Performed | | Correction Processing Not Performed | | Reduction Ratio (%) |
|---|---|---|---|---|---|---|
| | | Signal Intensity | Stray Light Ratio (%) | Signal Intensity | Stray Light Ratio (%) | |
| 450 | 0.09 | 0.0001 | 0.11 | 0.0003 | 0.37 | 29.7 |
| 500 | 0.19 | 0.0002 | 0.10 | 0.0004 | 0.22 | 45.5 |
| 600 | 0.50 | 0.0003 | 0.05 | 0.0005 | 0.10 | 50.0 |

As shown in the table above, it can be seen that the stray light ratio can be reduced to half or lower by applying the correction processing according to the present embodiment.

<Function and Effect in the Present Embodiment>

According to the embodiment of the present invention, on the detection surface of photodetector 25, the area where light split by spectrometer 24 is incident (detection area 25a) and the area where light split by spectrometer 24 is not incident (correction area 25b) are provided. During measurement, a spectrum and an intensity value are simultaneously obtained from each of detection area 25a and correction area 25b. Then, the correction value is calculated based on the intensity value detected in correction area 25b. In addition, the corrected spectrum is calculated by subtracting the calculated correction value from each component value (signal intensity at each wavelength) of the spectrum detected in detection area 25a.

The correction value as described above is a value reflecting an error component originating from stray light generated in the housing and an offset component caused by a dark current that flows in photodetector 25. Therefore, by correcting the spectrum detected in detection area 25a with such a correction value, a true spectrum of the measured light can accurately be obtained.

In addition, according to the embodiment of the present invention, a spectrum and an intensity value are simultaneously obtained from each of detection area 25a and correction area 25b provided on identical photodetector 25. Therefore, even when the error component originating from stray light generated in the housing and/or the offset component caused by the dark current that flows in photodetector 25 fluctuate/fluctuates over time, such an error component can reliably be eliminated. Namely, an error due to disturbance caused by an environmental factor such as an ambient temperature can more reliably be eliminated.

Moreover, it is not necessary to conduct dark measurement in order to obtain the error component originating from stray light generated in the housing and/or the offset component caused by the dark current that flows in photodetector 25. Therefore, as it is not necessary to open and close the shutter each time measurement is conducted, the time required for measurement can be shortened.

Further, according to the embodiment of the present invention, further correction is carried out by using the dark spectrum subjected to correction as described above (correction dark spectrum). Therefore, the spectrum output as the measurement result is free from an error component other than the error component originating from stray light and the offset component caused by the dark current. The spectrum of the object can thus more accurately be measured.

[First Variation]

In the embodiment described above, a configuration in which dark measurement is conducted prior to ordinary measurement so as to obtain the dark spectrum and the correction dark spectrum in advance has been illustrated. In the present variation, a configuration not requiring dark measurement will be illustrated.

<Overall Configuration of Device>

Figure 12:
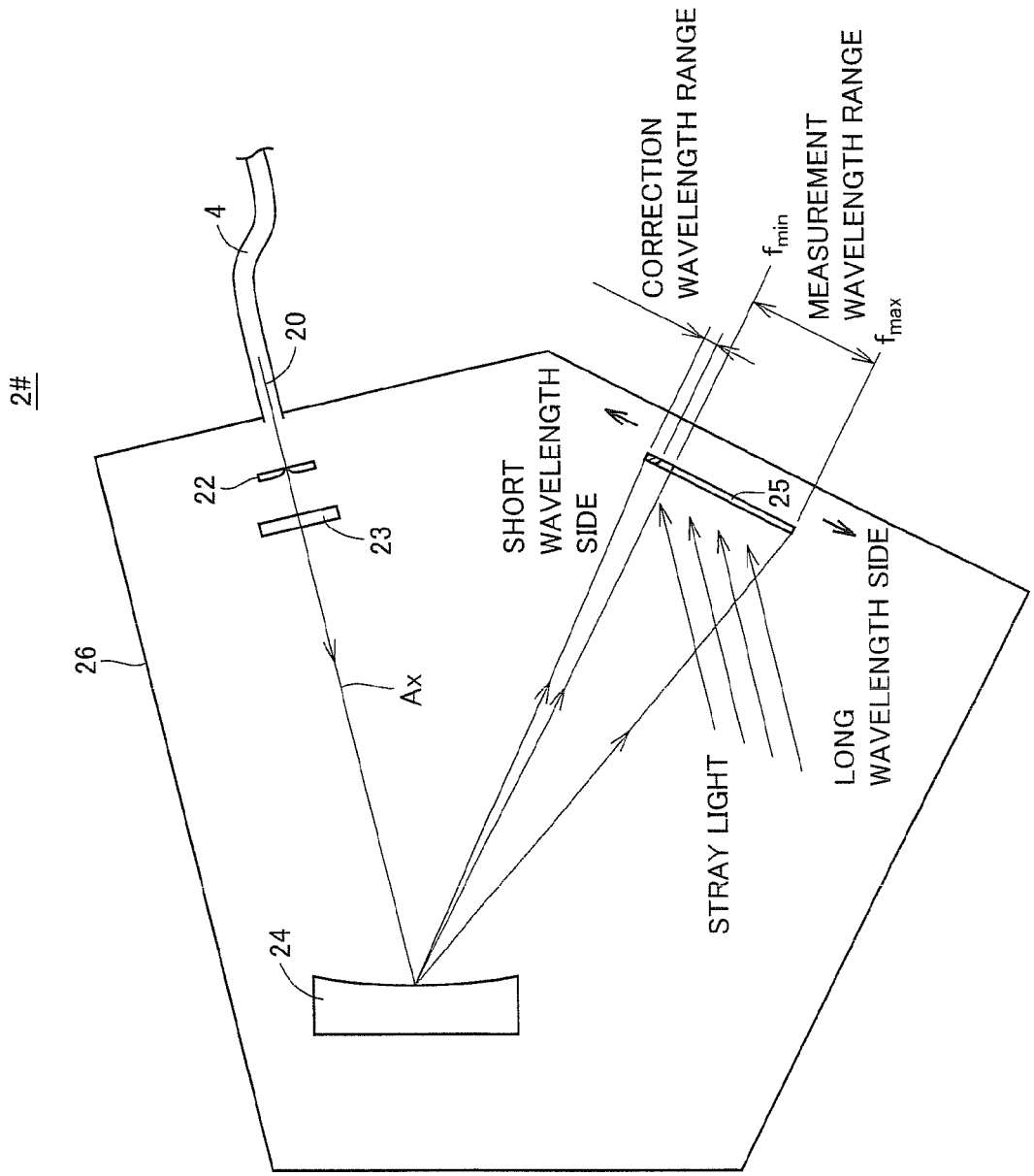
FIG. 12 is a functional block diagram showing overview of a measurement instrument main body according to a first variation of the embodiment of the present invention.

FIG. 12 is a functional block diagram showing overview of a measurement instrument main body 2# according to a first variation of the embodiment of the present invention. Measurement instrument main body 2# shown in FIG. 12 corresponds to measurement instrument main body 2 shown in FIG. 2 with shutter 21 being excluded. As measurement instrument main body 2# is otherwise the same as measurement instrument main body 2, detailed description will not be repeated.

<Dark Spectrum Characteristics>

Initially, a result of actual measurement of dark spectrum characteristics by using photodetector 25 will be illustrated.

(1. Temperature Dependency)

Figure 13:
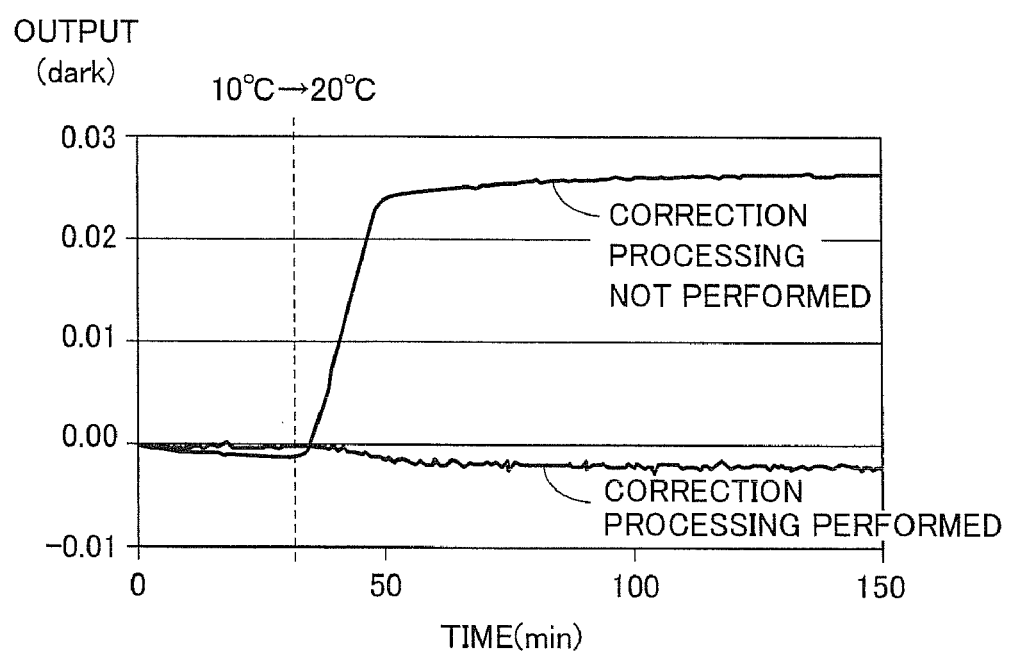
FIG. 13 is a diagram showing temperature dependency of a dark measurement result according to the embodiment of the present invention.

FIG. 13 is a diagram showing temperature dependency of a dark measurement result according to the embodiment of the present invention. Measurement results shown in FIG. 13 show change over time of outputs obtained when the measurement instrument main body was arranged in an isothermal layer and a temperature in the isothermal layer was varied. More specifically, the temperature in the isothermal layer was initially set to 10° C., and after 30 minutes have elapsed since start of measurement, the temperature in the isothermal layer was varied to 20° C. In addition, FIG. 13 shows measurement results of both of the dark spectrum (the correction processing not performed) and the correction dark spectrum (the correction processing performed). It is noted that an exposure time of photodetector 25 was set to 20 sec. A spectrum width of the dark spectrum and the correction dark spectrum was set to 250 to 750 nm, and an average value of output values at every 50 nm within this spectrum width was adopted as the measurement result.

As shown in FIG. 13, it can be seen that the output value of the dark spectrum (the correction processing not performed) fluctuates, being affected by variation in an ambient temperature. In contrast, it can be seen that the correction dark spectrum (the correction processing performed) is hardly affected by variation in the ambient temperature.

Figure 14A:
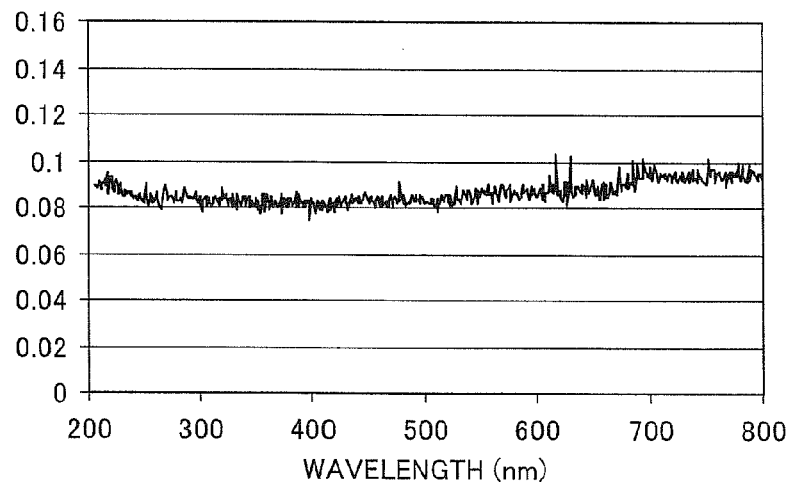
FIGS. 14A to 14C show measurement results showing temperature dependency of a dark spectrum according to the embodiment of the present invention.
Figure 14B:
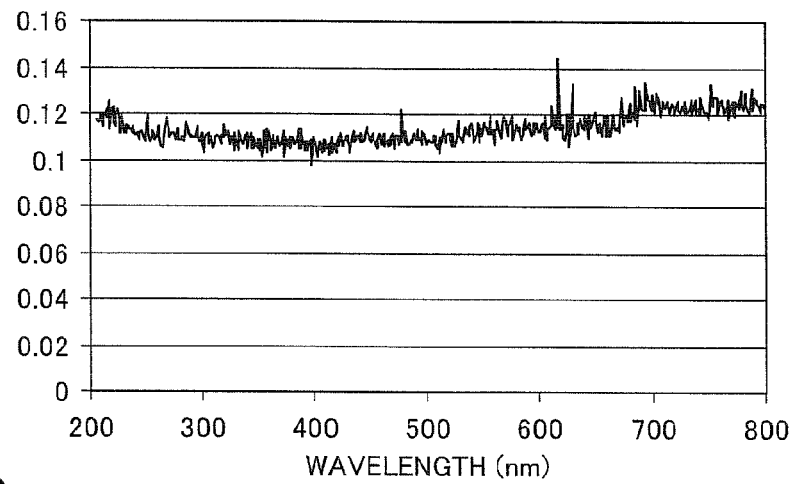
Figure 14C:
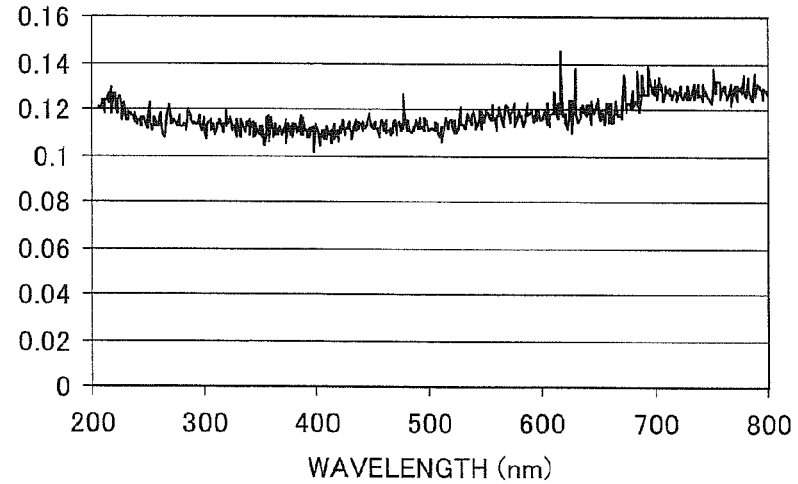
Figure 15A:
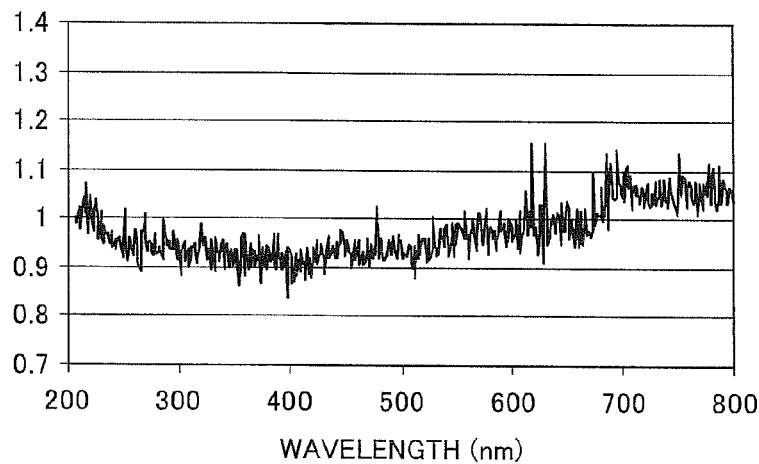
FIGS. 15A to 15C are diagrams showing dark patterns obtained from dark spectra shown in FIGS. 14A to 14C.
Figure 15B:
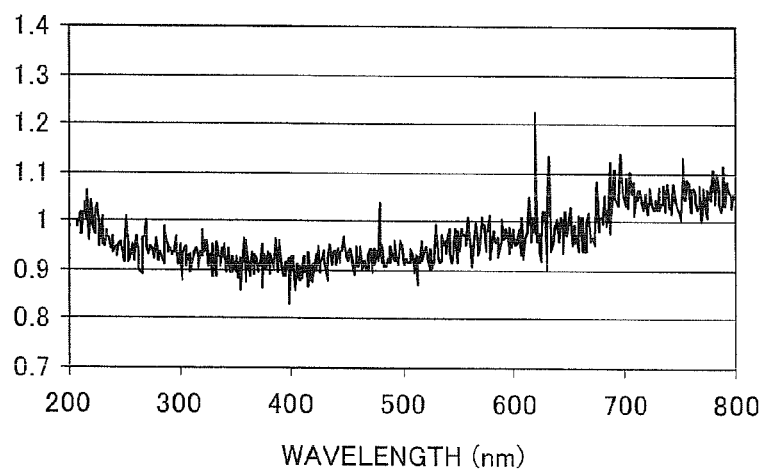
Figure 15C:
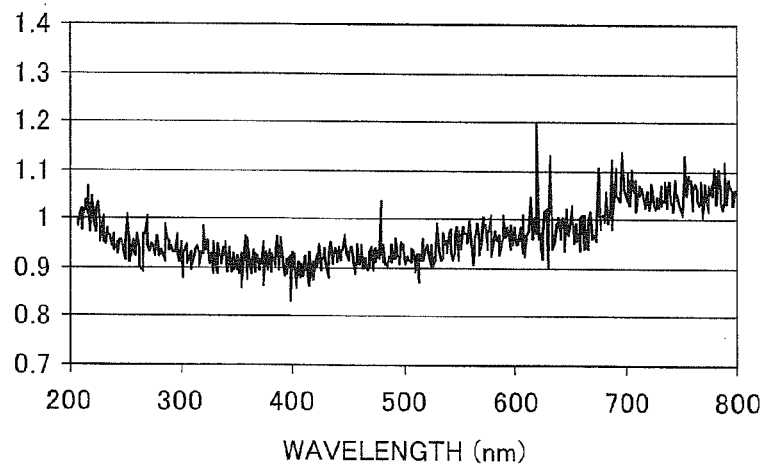

FIGS. 14A to 14C show measurement results showing temperature dependency of the dark spectrum according to the embodiment of the present invention. FIGS. 15A to 15C are diagrams showing dark patterns obtained from the dark spectra shown in FIGS. 14A to 14C.

FIG. 14A shows the dark spectrum when the ambient temperature was set to 10° C., FIG. 14B shows the dark spectrum when the ambient temperature was set to 20° C., and FIG.

14C shows the dark spectrum when the ambient temperature was set to 30° C. It is noted that the exposure time in photodetector 25 was also set to 20 sec as in FIG. 13.

Comparing the dark spectra shown in FIGS. 14A to 14C with one another, it can be seen that they are different in the absolute value of the amplitude corresponding to the same wavelength. Namely, it can be seen that the characteristic of the dark spectrum is affected by the ambient temperature.

FIGS. 15A to 15C show results of division of each component value of the dark spectrum (signal intensity at each wavelength) shown in FIGS. 14A to 14C by the component value (signal intensity) at the shortest wavelength of the corresponding dark spectrum. Namely, FIGS. 15A to 15C show wavelength characteristics obtained by normalizing the dark spectra in FIGS. 14A to 14C (which are referred to as a "dark pattern" for distinction from the dark spectrum indicating an actual amplitude).

Comparing the dark patterns shown in FIGS. 15A to 15C with one another, it can be seen that the dark patterns have substantially the same variation characteristic.

According to the measurement results shown above, it can be concluded that the characteristic of the dark spectrum output from photodetector 25 varies depending on the ambient temperature, whereas the dark pattern exhibits substantially the same characteristic regardless of the ambient temperature.

(2. Exposure Time Dependency)

Figure 16:
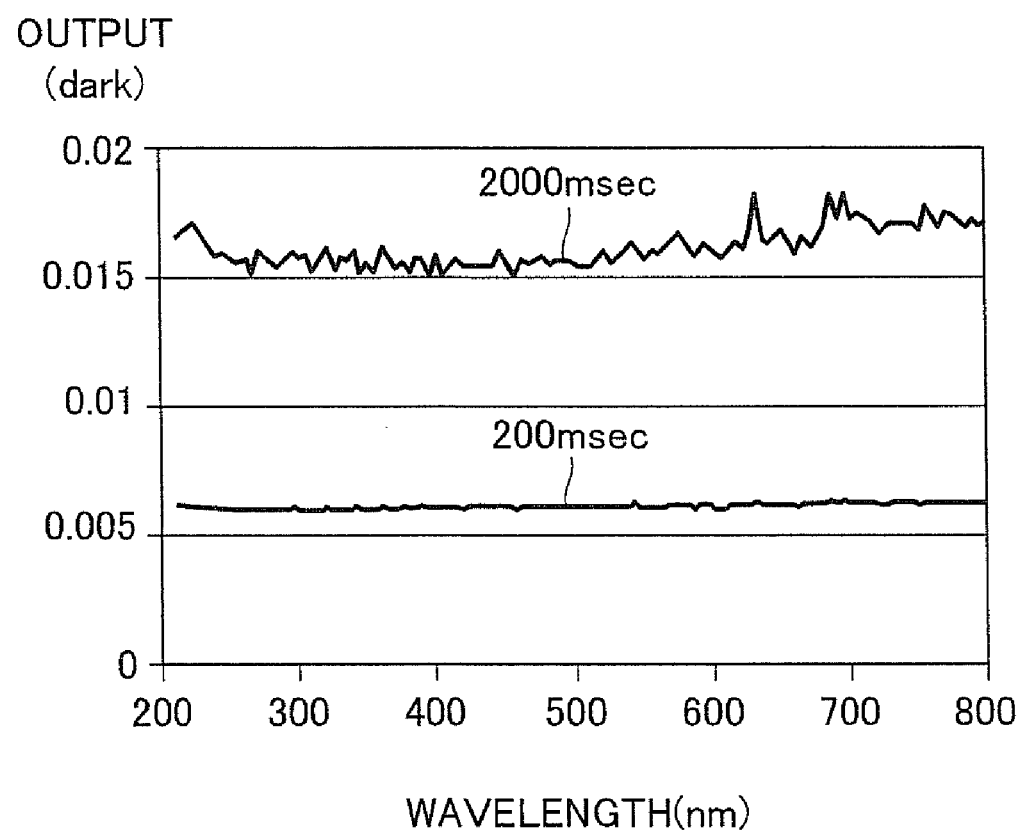
FIG. 16 is a diagram showing a measurement result indicating exposure time dependency of the dark measurement result according to the embodiment of the present invention.
Figure 17A:
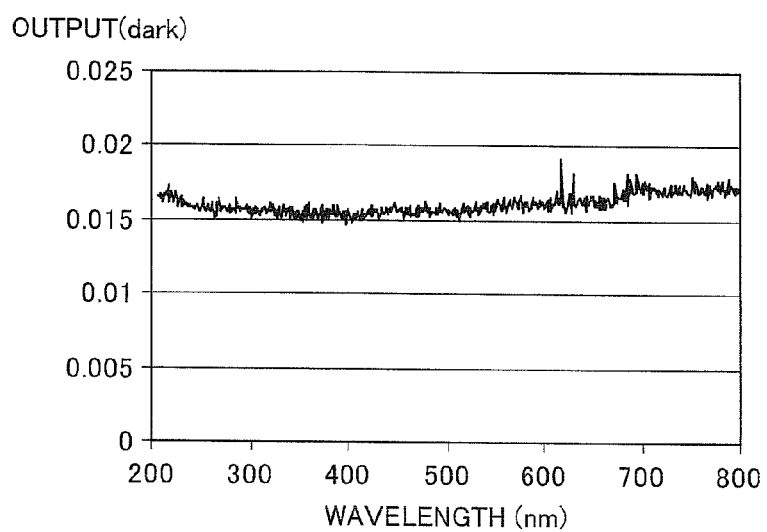
FIGS. 17A to 17C are diagrams showing other measurement results indicating exposure time dependency of the dark measurement result according to the embodiment of the present invention.
Figure 17B:
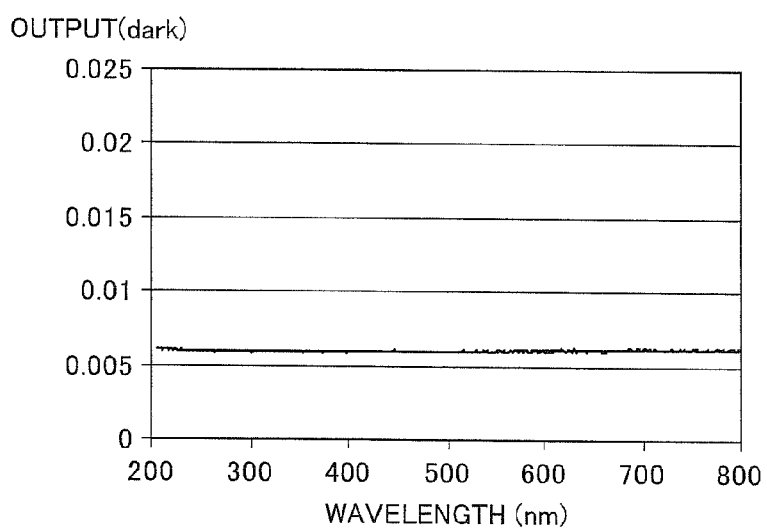
Figure 17C:
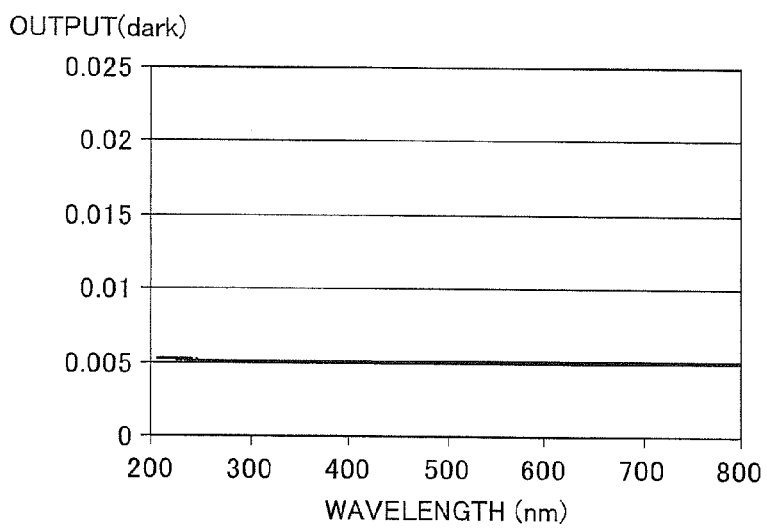

FIG. 16 is a diagram showing a measurement result indicating exposure time dependency of the dark measurement result according to the embodiment of the present invention. FIGS. 17A to 17C are diagrams showing other measurement results indicating exposure time dependency of the dark measurement result according to the embodiment of the present invention.

Measurement results shown in FIG. 16 show dark spectra obtained when the exposure time was set to 200 msec and 2000 msec while the ambient temperature of photodetector 25 was maintained constant.

As shown in FIG. 16, it can be seen that, as the exposure time is longer, an amount of light energy that enters photodetector 25 increases and hence the amplitude of the measured dark spectrum has also become great.

FIG. 17A shows the dark spectrum when the exposure time in photodetector 25 was set to 2000 msec, FIG. 17B shows the dark spectrum when the exposure time in photodetector 25 was set to 200 msec, and FIG. 17C shows the dark spectrum when the exposure time in photodetector 25 was set to 20 msec. In any example, the ambient temperature of photodetector 25 was set constant.

Comparing the dark spectra shown in FIGS. 17A to 17C with one another, it can be seen that magnitude of the amplitude fluctuates depending on the exposure time. As shown in FIGS. 17B and 17C, when the exposure time is relatively short, the absolute value itself of the detected signal intensity has become small, and hence the spectrum characteristic does not clearly appear.

According to the measurement results shown above, it can be concluded that the characteristic of the dark spectrum output from photodetector 25 varies depending on the exposure time. It is noted that the dark spectrum is mainly dependent on the dark current included in the output from photodetector 25. The dark current in photodetector 25 is dependent on a period during which photodetector 25 is active, that is, on an amount of accumulated charges. Therefore, in principle, it can be concluded that the amplitude of the dark spectrum is in proportion to a logarithmic value of the exposure time in photodetector 25.

<Overview of Correction Processing>

An optical characteristic measurement device 1A according to the present variation calculates an output spectrum by subtracting a corresponding component value of a correction dark spectrum from each component value of a correction measurement spectrum, as in optical characteristic measurement device 1 according to the embodiment described above.

Figure 18:
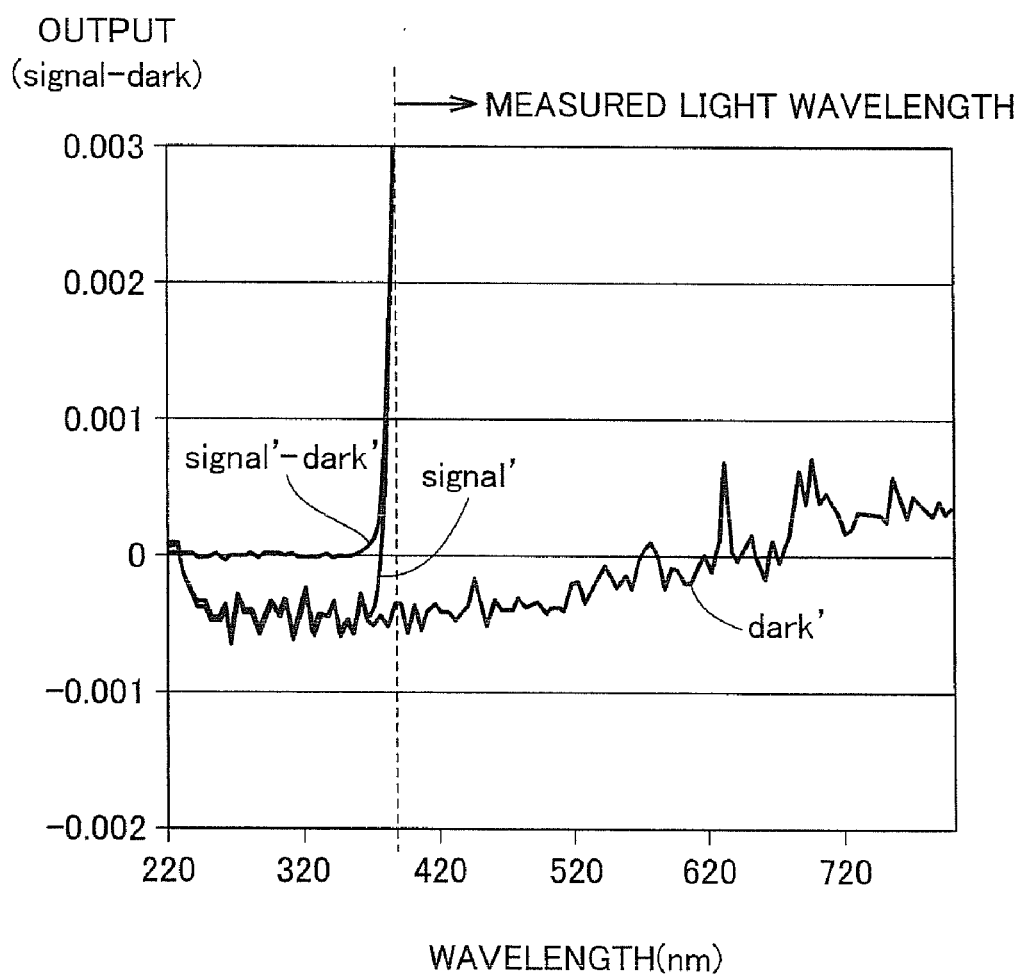
FIG. 18 is a diagram showing a measurement example using an optical characteristic measurement device according to the first variation of the embodiment of the present invention.

FIG. 18 is a diagram showing a measurement example using optical characteristic measurement device 1A according to the first variation of the embodiment of the present invention. FIG. 18 shows a measurement example as to measured light having the shortest wavelength at approximately 380 nm. Namely, in a wavelength range shorter than the shortest wavelength of the measured light, the measurement result after stray light correction (a correction measurement spectrum signal') should attain to zero. Actually, however, due to various factors as described above, the measurement result does not attain to zero. Therefore, by correcting correction measurement spectrum signal' with a correction dark spectrum dark', a result further reflecting a true measurement value (signal'−dark') can be obtained.

The optical characteristic measurement device shown in the present variation dynamically determines the correction dark spectrum necessary for the calculation processing as described above without conducting dark measurement. Thus, ordinary measurement can be started sooner.

More specifically, a correction dark pattern exhibiting a noise characteristic of photodetector 25 is prepared in advance, and the correction dark spectrum is determined (estimated) by multiplying this correction dark pattern by the amplitude measured in ordinary measurement. The correction dark pattern thus determined reflects the ambient temperature during ordinary measurement. As described above, as the amplitude (signal intensity) of the correction dark spectrum fluctuates depending on the exposure time, the present variation adopts a configuration where a plurality of correction dark patterns are prepared in correspondence with a plurality of exposure times that can be set in photodetector 25. Namely, in each ordinary measurement, one correction dark pattern corresponding to the exposure time set in photodetector 25 is selected and the correction dark spectrum is determined based on the selected correction dark pattern.

As will be described later, a common correction dark pattern may be prepared and the correction dark spectrum may be determined so as to reflect the ambient temperature and the exposure time in ordinary measurement.

<Control Structure>

Figure 19:
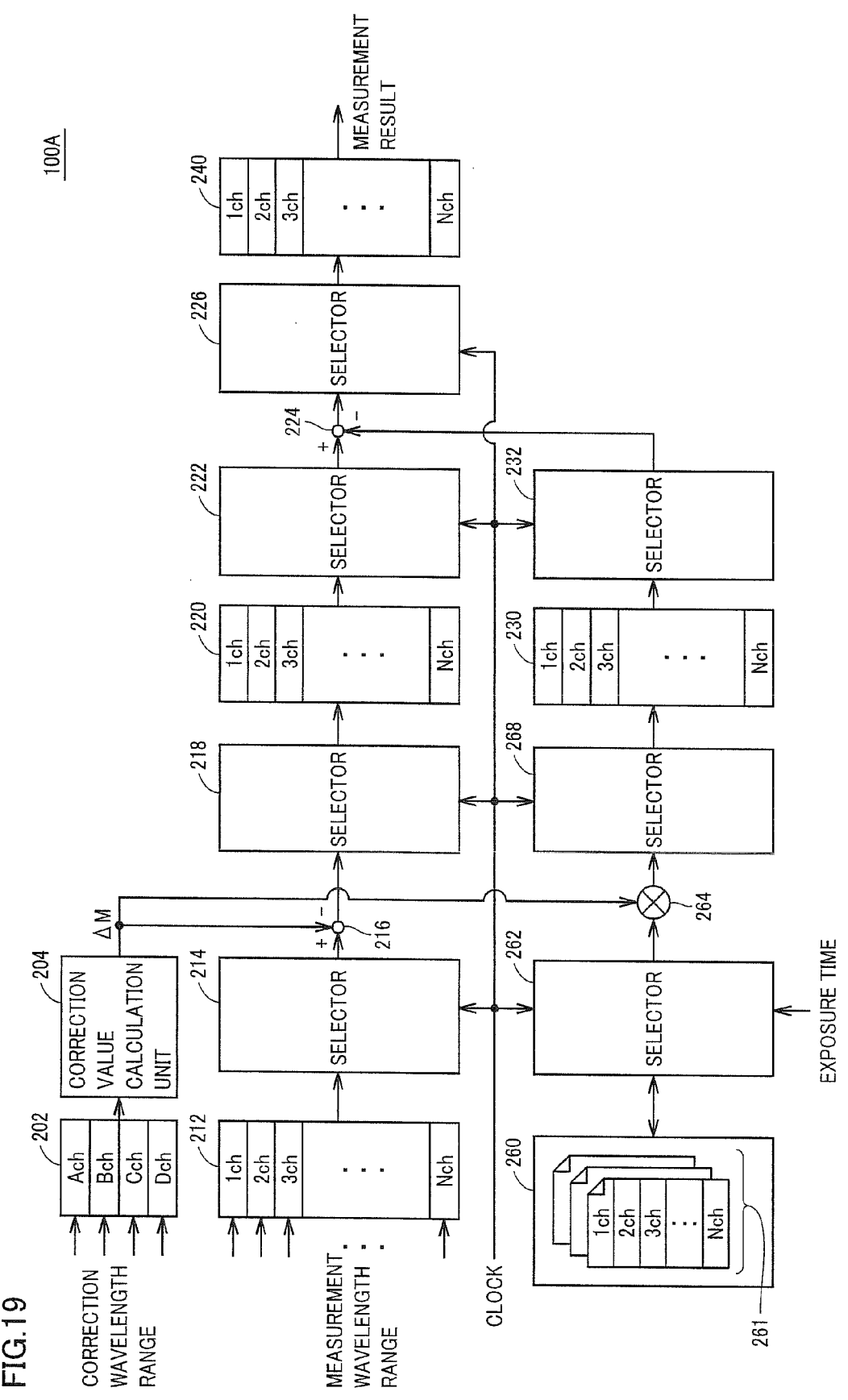
FIG. 19 is a schematic diagram showing a control structure in a processing device of the optical characteristic measurement device according to the first variation of the embodiment of the present invention.

FIG. 19 is a schematic diagram showing a control structure in a processing device 100A of the optical characteristic measurement device according to the first variation of the embodiment of the present invention.

Referring to FIG. 19, processing device 100A according to the present variation additionally includes a correction dark pattern storage unit 260, selectors 262 and 268, and a multiplication unit 264, as compared with processing device 100 shown in FIG. 9. These components dynamically determine the correction dark spectrum described above.

More specifically, correction dark pattern storage unit 260 stores a plurality of correction dark patterns 261 for respective exposure times that can be set in photodetector 25. Each correction dark pattern 261 is defined by at least N partitioned component values (1ch, 2ch, . . . , Nch) corresponding in number to the detection elements included in detection area 25a.

Selector 262 and multiplication unit 264 dynamically determine the correction dark spectrum in cooperation. More specifically, selector 262 selects correction dark pattern 261 corresponding to the exposure time set in photodetector 25, from among the plurality of correction dark patterns 261 stored in correction dark pattern storage unit 260. Selector 262 sequentially reads the component value (ratio) of selected correction dark pattern 261 and outputs it to multiplication unit 264, in response to clock signal CLOCK.

Multiplication unit 264 calculates the correction dark spectrum by multiplying the component value (ratio) input from selector 262 by correction value ΔM. Namely, in the present variation, correction value ΔM is used as a parameter reflecting the ambient temperature. This is because correction value ΔM reflects a value of stray light independent of the measured light, and assuming that magnitude of this stray light is substantially constant, a factor in fluctuation of the amplitude of correction value ΔM can be regarded as influence of the ambient temperature. Therefore, the correction dark spectrum of interest can be determined (estimated) by multiplying correction dark pattern 261 corresponding to the exposure time set in photodetector 25 by correction value ΔM.

In the present embodiment, the plurality of correction dark patterns 261 are experimentally obtained in advance as values normalized with correction value ΔM. It is considered that each of these correction dark patterns 261 often has a value specific to photodetector 25. Therefore, the plurality of correction dark patterns 261 may be determined, for example, by actually conducting measurement at the time of inspection before shipment or the like of measurement instrument main body 2 according to the present variation.

Namely, assuming that the component value at each wavelength of correction dark pattern 261 stored in correction dark pattern storage unit 260 is denoted as P(i) {where 1≦i≦N}, a signal intensity D(i) {where 1≦i≦N} at each wavelength of the correction dark spectrum stored in memory 230 can be expressed as follows.

$$D(i) = \Delta M \times P(i) \ \{\text{where } 1 \leq i \leq N\}$$

Selector 268 causes memory 230 to sequentially store each component value of the correction dark spectrum output from multiplication unit 264, in response to clock signal CLOCK common to selector 262.

As described above, since the operation performed after each component value of the correction dark spectrum is stored in memory 230 is the same as in processing device 100 shown in FIG. 9 above, detailed description will not be repeated.

<Measurement Procedure>

As described above, as optical characteristic measurement device 1A according to the present variation calculates the correction dark spectrum by using the correction dark pattern prepared in advance, dark measurement as described above is not necessary. A measurement procedure according to the present variation will be described hereinafter with reference to FIG. 20.

Figure 20:
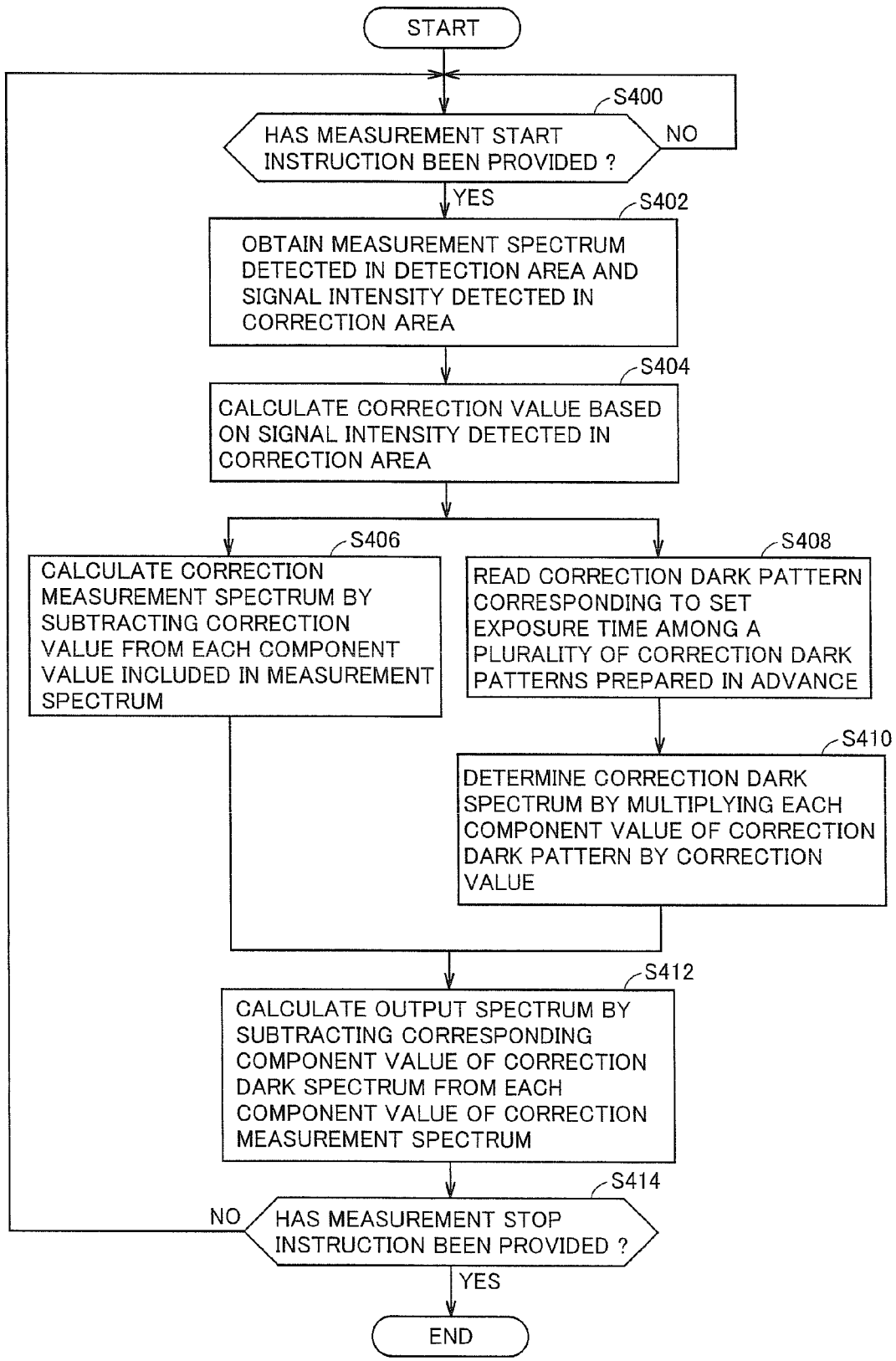
FIG. 20 is a flowchart showing a measurement procedure in the optical characteristic measurement device according to the first variation of the embodiment of the present invention.

FIG. 20 is a flowchart showing the measurement procedure in optical characteristic measurement device 1A according to the first variation of the embodiment of the present invention.

Referring to FIG. 20, processing device 100A determines whether the measurement start instruction has been provided or not (step S400). When the measurement start instruction has not been provided (NO in step S400), processing device 100A waits until the measurement start instruction is provided. Before the measurement start instruction is provided, positioning of the object and/or light reception portion 6 is carried out such that light emitted from the object is taken into light reception portion 6.

On the other hand, when the measurement start instruction is provided (YES in step S400), processing device 100A obtains the measurement spectrum detected in detection area 25a of photodetector 25 and the signal intensity detected in correction area 25b of photodetector 25 (step S402). In addition, processing device 100A calculates the correction value based on the signal intensity detected in correction area 25b (step S404). More specifically, an average value of a plurality of signal intensities detected in correction area 25b is calculated as the correction value.

In succession, processing device 100A calculates the correction measurement spectrum by (uniformly) subtracting the correction value calculated in step S404 from each component value (signal intensity) included in the measurement spectrum detected in detection area 25a, that was obtained in step S402 (step S406). Namely, processing device 100A calculates the correction measurement spectrum by correcting the measurement spectrum with the correction value calculated based on the signal intensity detected in correction area 25b.

In parallel to the above, processing device 100A reads the correction dark pattern corresponding to the set exposure time among the plurality of correction dark patterns prepared in advance (step S408). In succession, processing device 100A determines the correction dark spectrum by multiplying each component value of the read correction dark pattern by correction value ΔM (step S410).

In succession, processing device 100A calculates the output spectrum by subtracting the corresponding component value of the correction dark spectrum calculated in step S410 from each component value of the correction measurement spectrum calculated in step S406 (step S412). This output spectrum is output as the detection result.

Thereafter, processing device 100A determines whether the measurement stop instruction has been provided or not (step S414). When the measurement stop instruction has not been provided (NO in step S414), the process returns to step S400.

On the other hand, when the measurement stop instruction is provided (YES in step S414), the process ends.

As described above, in optical characteristic measurement device 1A according to the present variation, it is not necessary to conduct dark measurement in advance. Therefore, the time required for ordinary measurement can further be shortened.

<Function and Effect in the Present Embodiment>

According to optical characteristic measurement device 1A in the present variation, the correction dark spectrum that can be obtained in dark measurement is dynamically determined based on the correction dark pattern prepared in advance. Therefore, it is not necessary to conduct dark measurement prior to ordinary measurement. Consequently, it is not necessary to provide a shutter for cutting off disturbance light that enters the measurement instrument main body. Accordingly, the structure of the measurement instrument main body can further be simplified and manufacturing cost can also be reduced.

[Second Variation]

In the first variation of the embodiment of the present invention described above, a configuration in which a plurality of correction dark patterns are prepared in correspondence with a plurality of exposure times that can be set in photodetector 25 has been illustrated, however, a common correction dark pattern may be prepared and the correction dark spectrum may be determined such that the ambient temperature and the exposure time are reflected. A configuration for determining the correction dark spectrum based on such a common correction dark pattern will be illustrated hereinafter.

As the structure of the measurement instrument main body according to the present variation is the same as that of the measurement instrument main body according to the first variation shown in FIG. 12, detailed description will not be repeated.

As a control structure in a processing device according to the present variation is different from the control structure in the processing device according to the first variation shown in FIG. 19 only in a configuration for determining the correction dark spectrum, this different configuration will be described hereinafter.

Figure 21:
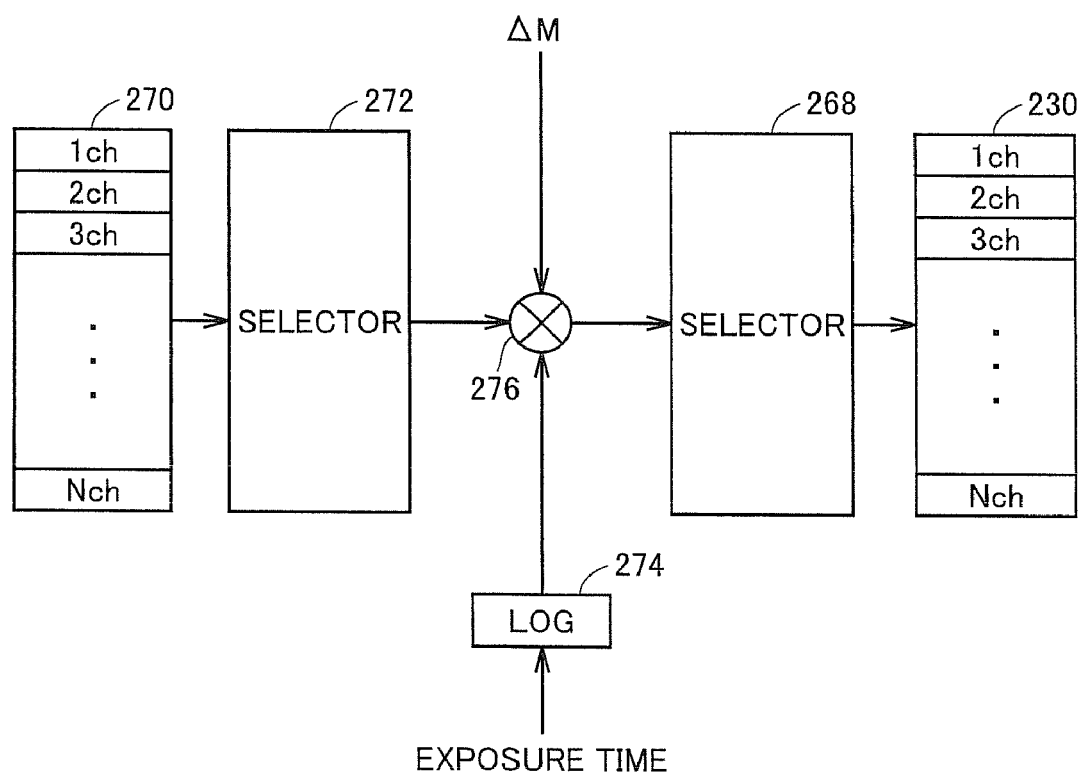
FIG. 21 is a schematic diagram showing a substantial part of a control structure in a processing device of an optical characteristic measurement device according to a second variation of the embodiment of the present invention.

FIG. 21 is a schematic diagram showing a substantial part of the control structure in the processing device of the optical characteristic measurement device according to a second variation of the embodiment of the present invention.

Referring to FIG. 21, the processing device according to the present variation includes a common correction dark pattern storage unit 270, a selector 272, a logarithmic operation unit 274, a multiplication unit 276, selector 268, and memory 230.

Common correction dark pattern storage unit 270 stores a common correction dark pattern. This common correction dark pattern is defined by at least N partitioned component values (1*ch*, 2*ch*, . . . , N*ch*) corresponding in number to the detection elements included in detection area 25*a*.

Selector 272, logarithmic operation unit 274 and multiplication unit 276 dynamically determine the correction dark spectrum in cooperation. As the amplitude of the correction dark spectrum is in proportion to a logarithmic value of the exposure time in photodetector 25, logarithmic operation unit 274 and multiplication unit 276 correct the common correction dark pattern with the logarithmic value of the exposure time. At the same time, multiplication unit 276 corrects the common correction dark pattern with correction value $\Delta M$. Thus, the correction dark spectrum reflecting the exposure time and the ambient temperature at the time of measurement can be determined based on the common correction dark pattern.

More specifically, selector 272 sequentially reads each component value of the common correction dark pattern stored in common correction dark pattern storage unit 270 and outputs it to multiplication unit 276. Receiving the exposure time in photodetector 25, logarithmic operation unit 274 outputs the logarithmic value thereof. Multiplication unit 276 calculates the correction dark spectrum by multiplying the component value (ratio) input from selector 272 by the logarithmic value of the exposure time which is the correction value and correction value $\Delta M$. The correction dark spectrum is stored in memory 230 through selector 268.

Since the operation performed after each component value of the correction dark spectrum is stored in memory 230 is the same as in processing device 100 shown in FIG. 9 above, detailed description will not be repeated.

As described above, since it is only necessary to prepare a common correction dark pattern in advance in the optical characteristic measurement device according to the present variation, the configuration can be more simplified, as compared with an example where a plurality of correction dark patterns are prepared.

[Third Variation]

In the first and second variations of the embodiment of the present invention described above, a configuration in which the correction dark pattern obtained by normalizing the correction dark spectrum is obtained in advance has been illustrated, however, a dark pattern obtained by normalizing the dark spectrum may be obtained in advance. Namely, any of the correction dark pattern and the dark pattern may be adopted as the pattern exhibiting the noise characteristic of photodetector 25.

Here, for example, in the control structure (FIG. 19) in processing device 100A according to the first variation described above, a dark pattern storage unit for storing a plurality of dark patterns obtained for respective exposure times is provided instead of correction dark pattern storage unit 260. Then, selector 262 and multiplication unit 264 dynamically determine the dark spectrum.

Here, as not the correction dark spectrum but the dark spectrum is determined, processing for correcting the dark spectrum to the correction dark spectrum is further performed. Typically, a subtraction unit similar to subtraction unit 216 is provided in a stage subsequent to multiplication unit 264 shown in FIG. 19, and this subtraction unit subtracts correction value $\Delta M$ from each component value of the dark spectrum output from multiplication unit 264. The correction dark spectrum is thus obtained. As the subsequent processing is the same as in the first variation described above, detailed description will not be repeated.

Similarly, in the control structure (FIG. 21) in the processing device according to the second variation described above, a common dark pattern storage unit for storing a common dark pattern is provided instead of common correction dark pattern storage unit 270. Then, selector 272, logarithmic operation unit 274 and multiplication unit 276 dynamically determine the dark spectrum. In addition, processing for correcting the determined dark spectrum to the correction dark spectrum is further performed. Typically, a subtraction unit similar to subtraction unit 216 (FIG. 19) is provided in a stage subsequent to multiplication unit 276 shown in FIG. 21, and this subtraction unit subtracts correction value $\Delta M$ from each component value of the dark spectrum output from multiplication unit 276. The correction dark spectrum is thus obtained. As the subsequent processing is the same as in the second variation described above, detailed description will not be repeated.

[Fourth Variation]

In the embodiment described above, an example where measurement instrument main body 2 and processing device 100 are implemented as independent devices respectively has been illustrated, however, these devices may be integrated.

[Fifth Variation]

The program according to the present invention may invoke a necessary module from among program modules provided as a part of an operation system (OS) of the computer at prescribed timing in prescribed sequences and to cause the module to perform processing. Here, the program itself does not include the module above but processing is performed in cooperation with the OS. Such a program not including a module may also be encompassed in the program according to the present invention.

In addition, the program according to the present invention may be provided in a manner incorporated in a part of another program. In that case as well, the program itself does not include a module included in another program above but processing is performed in cooperation with another program. Such a program incorporated in another program may also be encompassed in the program according to the present invention.

Moreover, the functions implemented by the program according to the present invention may partially or entirely be implemented by dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An optical characteristic measurement device, comprising:
   a housing;
   a spectrometer arranged in said housing;
   a cut-off portion for cutting off light entering said spectrometer from outside of said housing;
   a photodetector arranged in said housing, for receiving light split by said spectrometer; and
   a processing unit for outputting a result of detection by said photodetector,
   said photodetector having a detection surface greater than a light incident surface receiving light from said spectrometer, and
   said processing unit being operative to
      obtain a first spectrum detected in a first detection area corresponding to said light incident surface receiving light from said spectrometer and a first signal intensity detected in a second detection area different from said light incident surface receiving light from said spectrometer while said light entering said housing is cut off,
      calculate a first correction spectrum by subtracting a first correction value calculated based on said first signal intensity from each component value of said first spectrum,
      obtain a second spectrum detected in said first detection area and a second signal intensity detected in said second detection area while said cut-off portion is opened,
      calculate a second correction spectrum by subtracting a second correction value calculated based on said second signal intensity from each component value of said second spectrum, and
      calculate an output spectrum representing a measurement result by subtracting each component value of said first correction spectrum from a corresponding component value of said second correction spectrum.

2. The optical characteristic measurement device according to claim 1, further comprising a cut-off filter arranged on an optical path through which light taken into said housing enters said spectrometer, for cutting off light having a wavelength shorter than a prescribed wavelength.

3. The optical characteristic measurement device according to claim 2, wherein said second detection area is provided on a short wavelength side continuing from said first detection area.

4. The optical characteristic measurement device according to claim 1, wherein
   said second detection area includes a plurality of detection elements,
   said first correction value is an average value of first signal intensities detected by said plurality of detection elements respectively, and
   said second correction value is an average value of second signal intensities detected by said plurality of detection elements respectively.

5. The optical characteristic measurement device according to claim 1, wherein
   said processing unit includes a storage unit for storing said first correction spectrum.

6. An optical characteristic measurement method, comprising the steps of:
   preparing a measurement device including a spectrometer and a photodetector for receiving light split by said spectrometer, that are arranged in a housing, said photodetector having a detection surface greater than a light incident surface receiving light from said spectrometer;
   obtaining a first spectrum detected in a first detection area corresponding to said light incident surface receiving light from said spectrometer and a first signal intensity detected in a second detection area different from said light incident surface receiving light from said spectrometer while light entering said housing is cut off;
   calculating a first correction spectrum by subtracting a first correction value calculated based on said first signal intensity from each component value of said first spectrum;
   obtaining a second spectrum detected in said first detection area and a second signal intensity detected in said second detection area while a cut-off portion is opened;
   calculating a second correction spectrum by subtracting a second correction value calculated based on said second signal intensity from each component value of said second spectrum; and
   calculating an output spectrum representing a measurement result by subtracting each component value of said first correction spectrum from a corresponding component value of said second correction spectrum.

* * * * *